(12) United States Patent
Ijima et al.

(10) Patent No.: US 7,014,798 B2
(45) Date of Patent: Mar. 21, 2006

(54) METHOD FOR MANUFACTURING AN OPTICAL PICKUP

(75) Inventors: Shinichi Ijima, Takatsuki (JP); Teruki Ishido, Takatsuki (JP); Kazuhiko Yamanaka, Takatsuki (JP); Kazutoshi Onozawa, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 520 days.

(21) Appl. No.: 10/403,941

(22) Filed: Mar. 31, 2003

(65) Prior Publication Data

US 2003/0234457 A1    Dec. 25, 2003

(30) Foreign Application Priority Data

Apr. 3, 2002  (JP) .............................. 2002-101871

(51) Int. Cl.
    *B29D 11/00*   (2006.01)
(52) U.S. Cl. ................... 264/1.7; 264/2.7; 264/272.11; 359/823; 359/824; 369/44.15
(58) Field of Classification Search ................ 264/1.1, 264/1.7, 2.7, 272.11, 272.15; 369/44.14, 369/44.15; 359/811, 823, 824
    See application file for complete search history.

(56) References Cited

U.S. PATENT DOCUMENTS

| 5,500,771 | A | * | 3/1996 | Tomiyama | ................. 359/813 |
| 5,892,628 | A |  | 4/1999 | Ikari | |
| 5,999,501 | A | * | 12/1999 | Tomita et al. | ........... 369/44.15 |
| 6,160,771 | A | * | 12/2000 | Kawano et al. | .......... 369/44.15 |
| 6,473,248 | B1 | * | 10/2002 | Nakanishi et al. | .......... 359/824 |
| 6,665,238 | B1 | * | 12/2003 | Iijima et al. | ............. 369/44.15 |
| 6,735,024 | B1 | * | 5/2004 | Nakanishi et al. | .......... 359/813 |

FOREIGN PATENT DOCUMENTS

| JP | 07-014187 | 1/1995 |
| JP | 09-219031 | 8/1997 |
| JP | 10-124898 | 5/1998 |
| JP | 10069655 | 10/1998 |
| JP | 2001-344784 | 12/2001 |

* cited by examiner

Primary Examiner—Mathieu D. Vargot

(57) ABSTRACT

To provide a manufacturing method for an optical pickup in which a movable member carrying an objective lens is supported by a fixed member through a pair of elastic support member groups, which are each made up of a plurality of parallel elastic support members, so as to be movable in focusing and tracking directions. In a suspension unit forming step, two holding members are formed from a synthetic resin by insert molding at different positions of each elastic support member group in a lengthwise direction of the elastic support members, thereby forming a pair of suspension units. In a connecting step, the pair of suspension units are opposed with an arrangement direction of the elastic support members being substantially the same as the focusing direction, and one holding member of each suspension unit is connected to the movable member and the other holding member to the fixed member.

12 Claims, 21 Drawing Sheets

400

FIG. 2
PRIOR ART
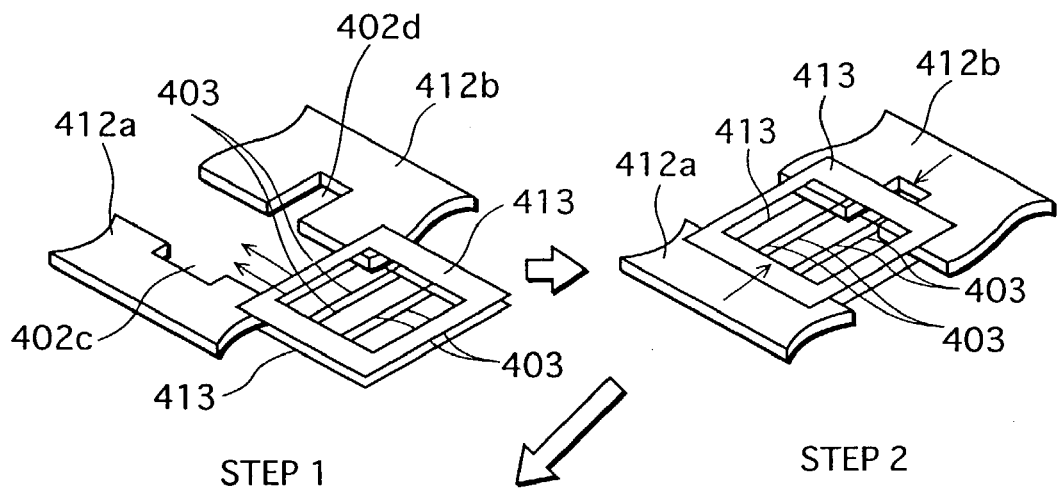
STEP 1    STEP 2
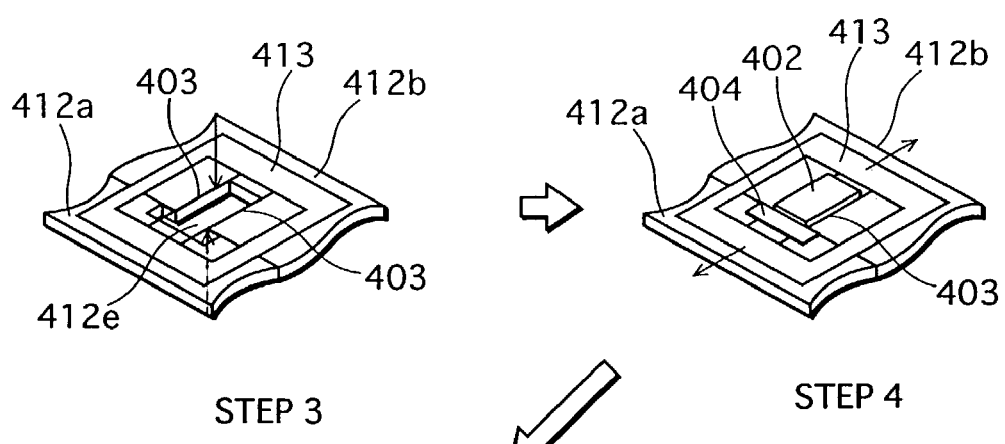
STEP 3    STEP 4
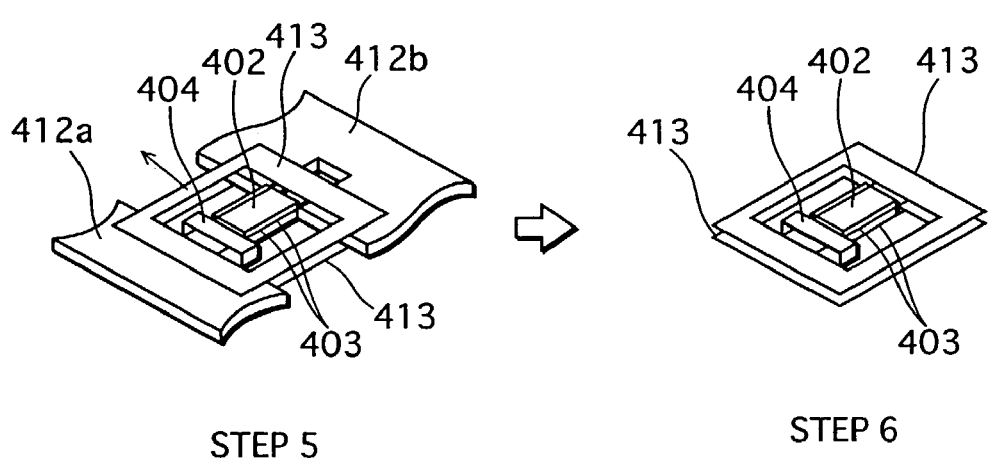
STEP 5    STEP 6

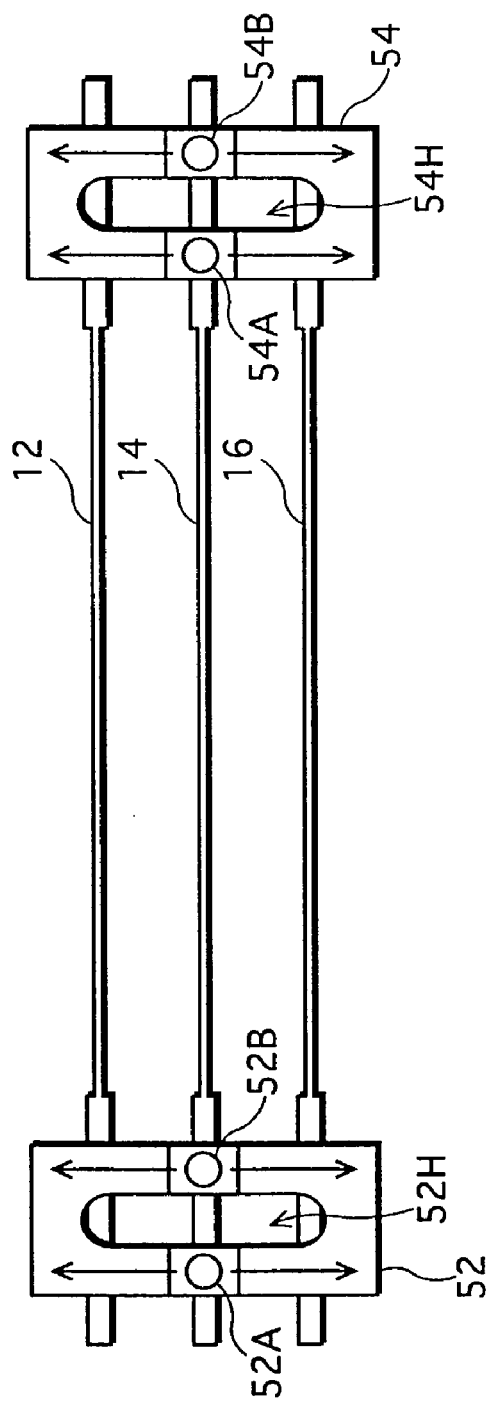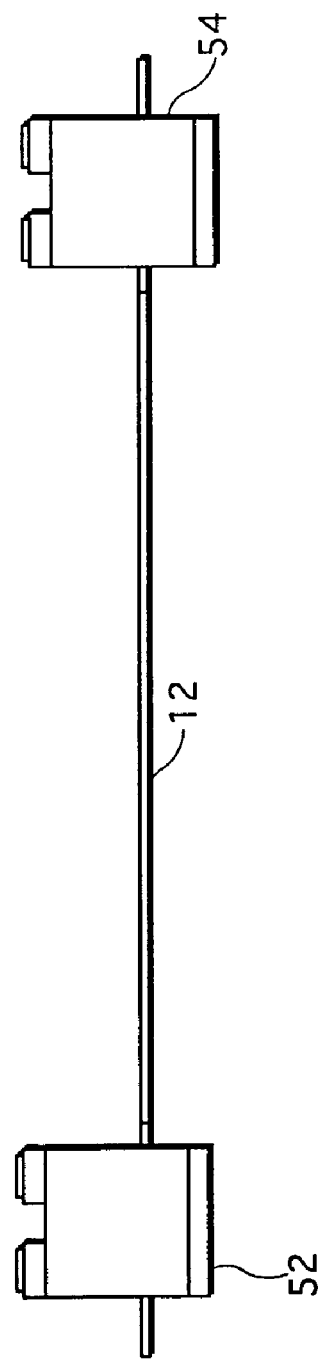

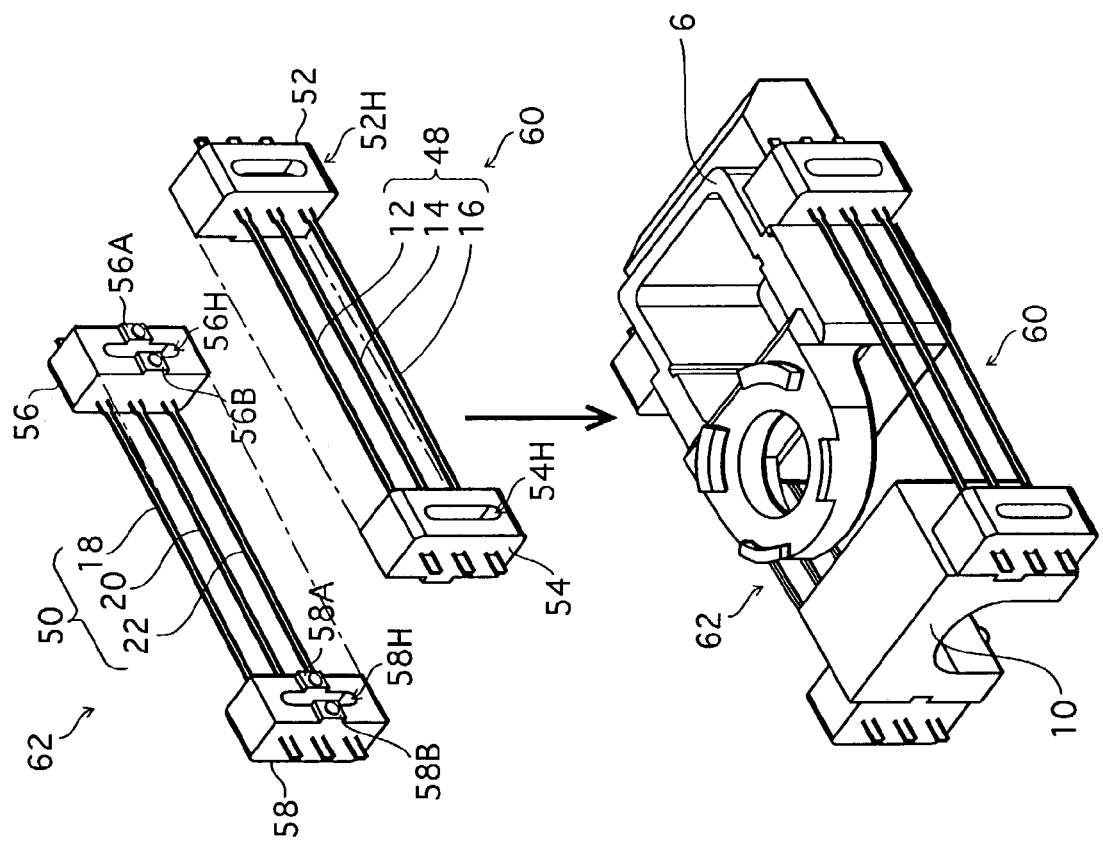

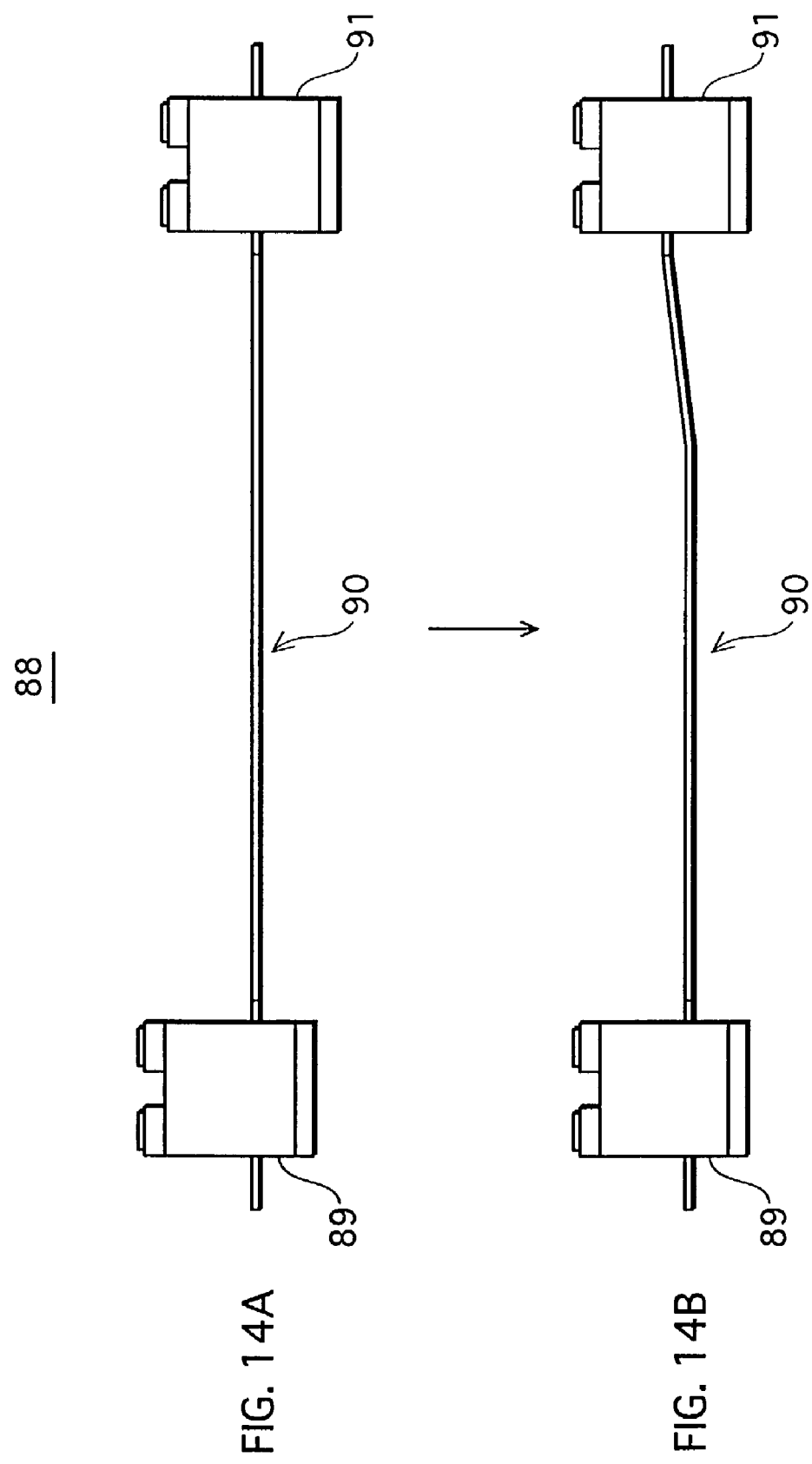

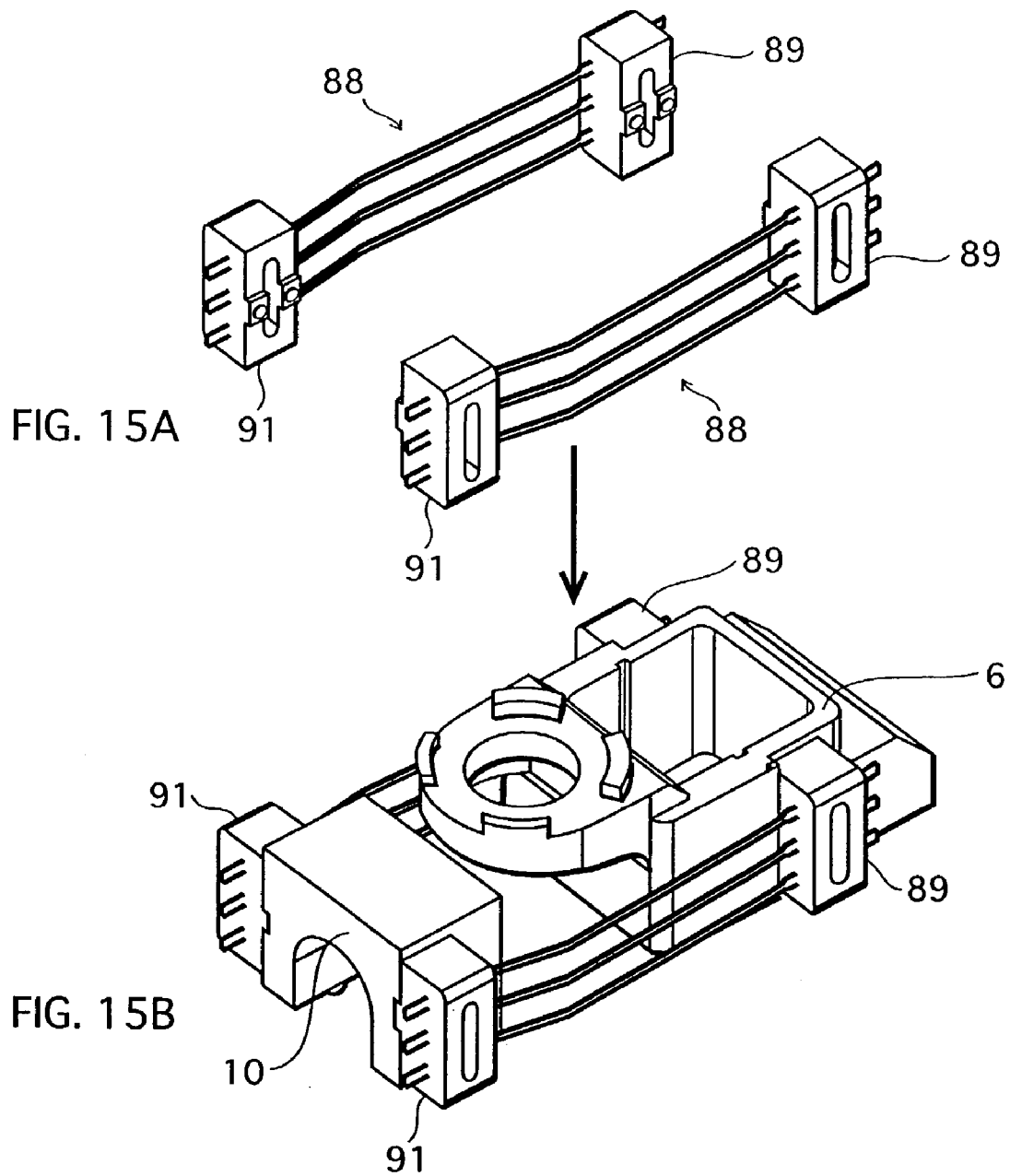

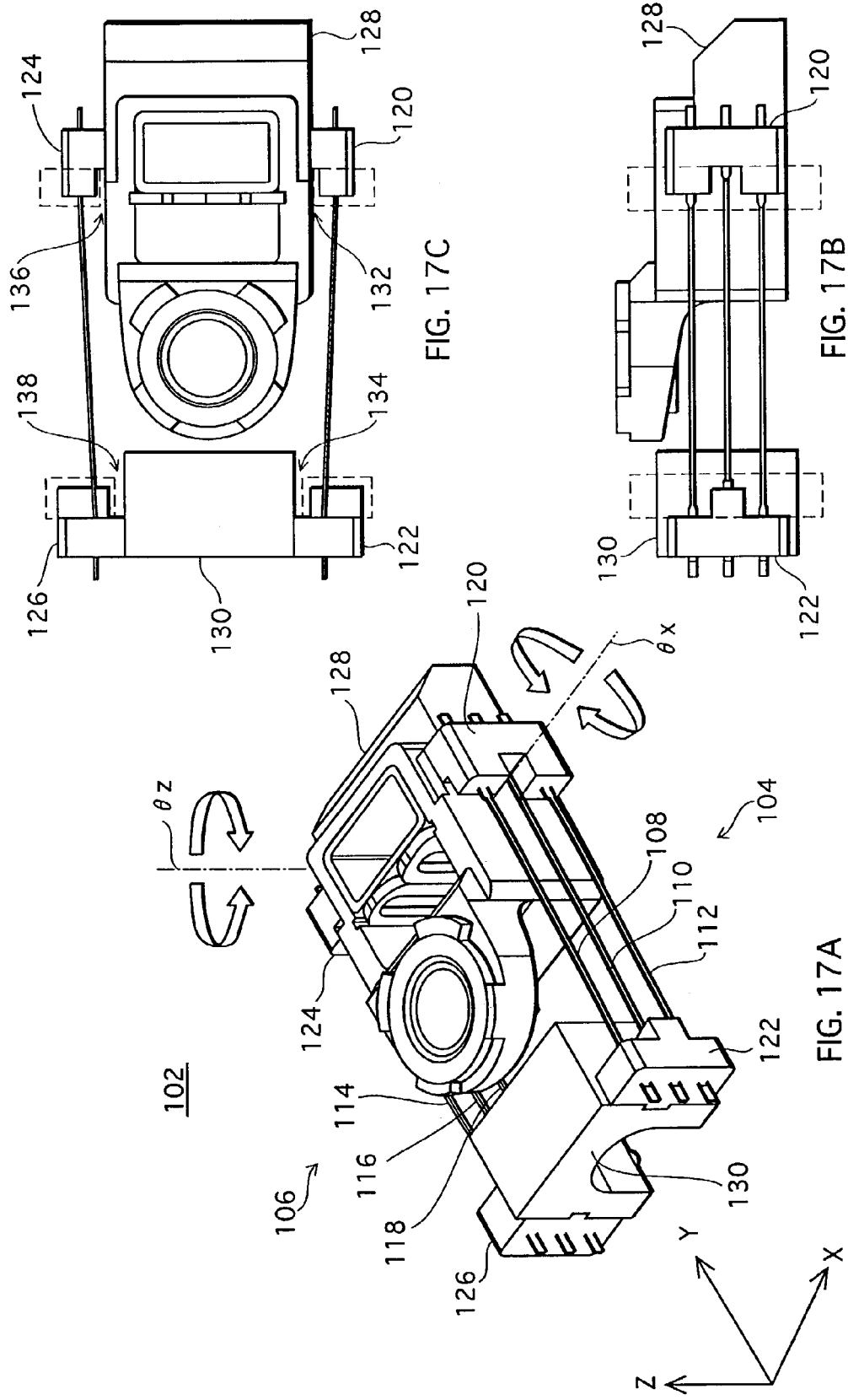

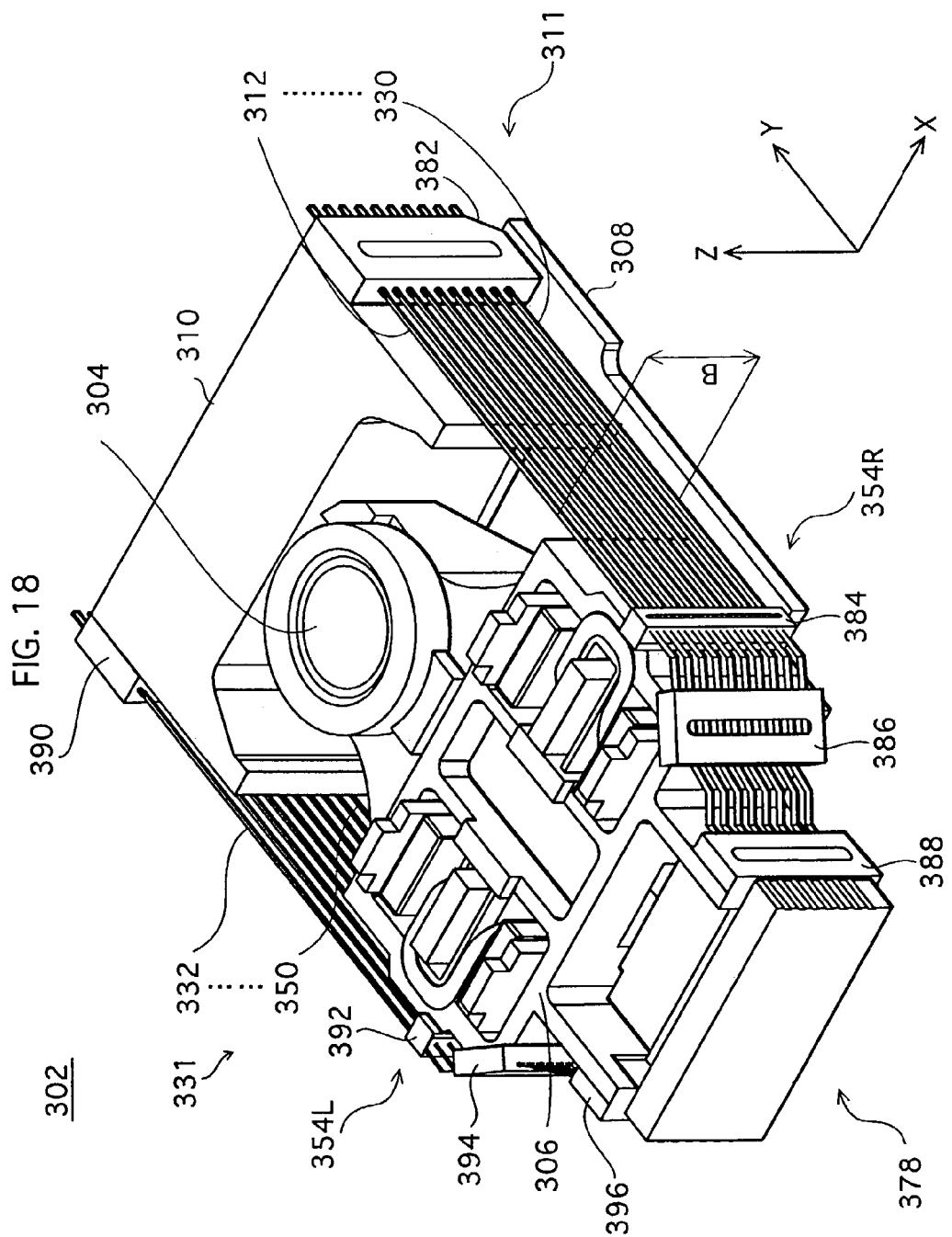

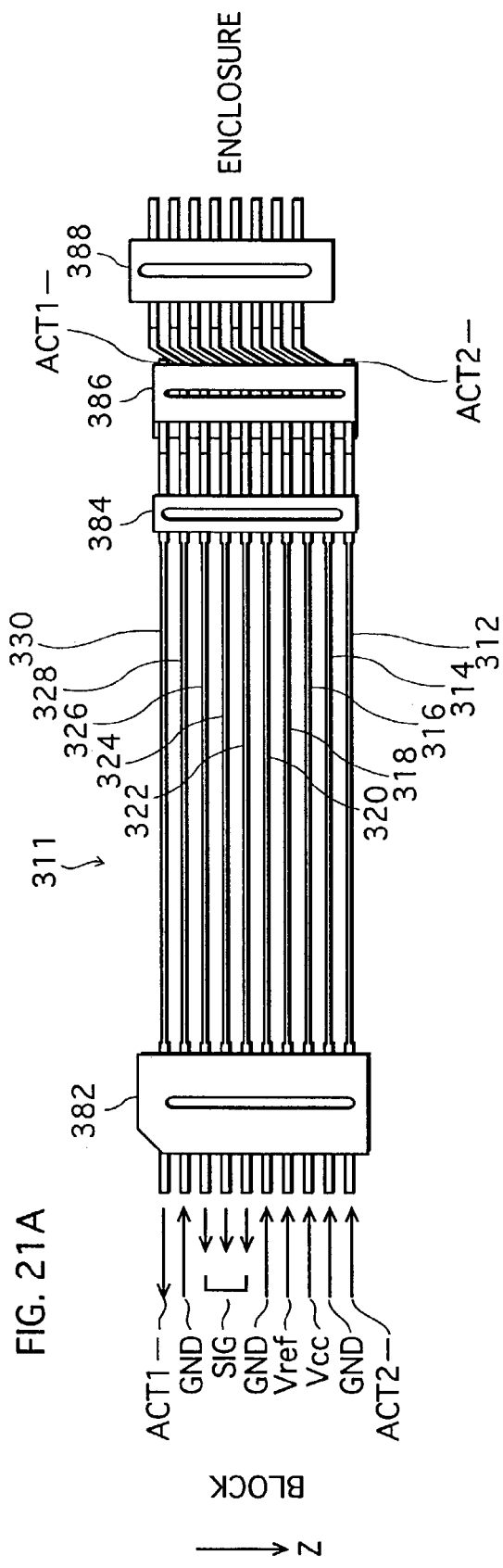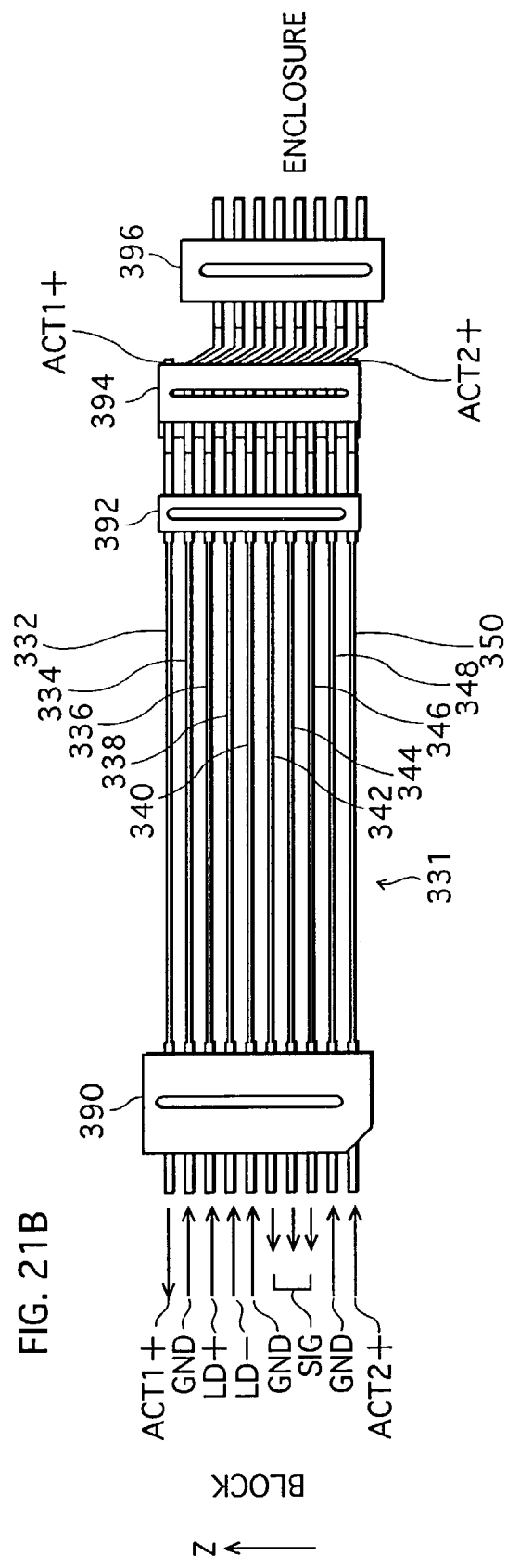

METHOD FOR MANUFACTURING AN OPTICAL PICKUP

This application is based on an application No. 2002-101871 filed in Japan, the contents of which are hereby incorporated by reference.

BACKGROUND OF THE INVENTION

1. Field of the Invention

The present invention relates to a method for manufacturing an optical pickup. The invention in particular relates to a manufacturing method for an optical pickup in which a movable member carrying an objective lens is movably supported by a fixed member through a plurality of elastic support members.

2. Prior Art

An optical pickup is used to read information from (i.e. playback) or write information onto (i.e. recording) an optical recording medium such as a CD (compact disc) or a DVD (digital versatile disc). Such an optical pickup is expected to record/play information reliably without being affected by the wobble of the information recording surface or track of the optical recording medium. For this purpose, the optical pickup needs to have a mechanism of moving an objective lens in a vertical direction (focusing direction) and in a direction orthogonal to the optical axis of the objective lens (tracking direction) while keeping the objective lens horizontal. In this way, it is possible to include a desired position on the information recording surface of the optical recording medium in the focus depth of the objective lens, and to have the laser beam accurately follow the track of the optical recording medium.

One example of this mechanism is explained below. A movable member carrying an objective lens and a fixed member are connected to each other by a total of four elastic support members, that is, two elastic support members arranged in a vertical direction on one side of the objective lens and two elastic support members arranged in the vertical direction on the other side of the objective lens. These elastic support members are connected to the movable member and the fixed member using solder or an adhesive.

When solder is used, however, the influence of heat generated from the molten solder extends to the connecting parts, which tends to cause the movable member or the fixed member to become thermally deformed. Hence it is difficult to ensure the precise connection positions of the elastic support members. When an adhesive is used, on the other hand, the shrinkage of the adhesive as a result of hardening is relatively high, which tends to cause the elastic support members to be displaced.

In view of this, a method of manufacturing an optical pickup by connecting the elastic support members to the movable member and the fixed member by means of insert molding has been proposed (Unexamined Japanese Patent Application Publication No. H10-69655). According to this method, both end portions of each elastic support member are inserted into the movable member and the fixed member when injection-molding the movable member and the fixed member.

FIG. 1 is a perspective view of an optical pickup 400. In this optical pickup 400, four elastic support members 403a, 403b, 403c, and 403d have their end portions inserted in a lens holder (movable member) 402 and a stator (fixed member) 404 by insert molding. FIG. 2 shows manufacturing steps of this insert molding.

In FIG. 2, two suspension sheets 413 which each have two elastic support members 403 are inserted into a mold (not illustrated), along the upper and lower surfaces of a slide core 412a having a depression 402c and a slide core 412b having a depression 402d (step 1). The slide cores 412a and 412b are then slid toward each other along the elastic support members 403, until they come in substantial contact with each other at a predetermined position (step 2). Here, the depression 402c of the slide core 412a faces the depression 402d of the slide core 412b. This being so, a hole 412e is formed when the slide cores 412a and 412b are in contact with each other. Following this, the mold is closed from above and below the slide cores 412a and 412b (in the vertical direction designated by the arrows in step 3 in the drawing), so as to form mold cavities for molding the stator 404 and the lens holder 402 and also to clamp the elastic support members 403 with the slide cores 412a and 412b and the upper and lower halves of the mold (step 3). Then insert molding is performed by pouring a resin into the mold cavities to mold the stator 404 and the lens holder 402 with the elastic support members 403 being partially inserted in the stator 404 and the lens holder 402 (step 4). After this, the mold and the slide cores 412a and 412b are removed (step 5), and the elastic support members 403 are detached from the suspension sheets 413 (step 6).

As a result of this insert molding, the stator 404 and the lens holder 402 are connected to each other by the four elastic support members 403. By mounting an objective lens 401, a focusing coil 405, tracking coils 406, and the like onto this construction, the optical pickup 400 is completed. According to this method, an optical pickup can be manufactured without suffering from the aforementioned problems associated with soldering and adhesion.

This optical pickup 400 is equipped with an MC (moving coil) actuator in which the focusing coil 405 and the tracking coils 406 are mounted on the movable member (lens holder 402). This being so, two elastic support members 403 out of the four elastic support members 403 act as wires for supplying power to the focusing coil 405, and the remaining two elastic support members 403 act as wires for supplying power to the tracking coils 406.

To adapt to the recent demand for high-performance optical pickups, the above type of optical pickup often includes additional electrical/electronic components such as a liquid crystal tilt correction component for making corrections for optical aberration and a numerical aperture changing component for changing an optical constant. To ensure high optical properties, it is desirable for these electrical/electronic components to be mounted on the movable member on which the objective lens is mounted, so as to maintain their relative positions with the objective lens. In such a case, additional wires, i.e., additional elastic support members, for these electrical/electronic components are required.

According to the above manufacturing method, however, it is not practical to add more elastic support members in the focusing direction. It may not be altogether impossible to add one more elastic support member on both sides of the objective lens in the focusing direction by using one more suspension sheet and one more pair of slide cores. However, this requires an extremely complex mold structure, and causes a significant drop in productivity. Hence the above manufacturing method cannot be employed in this case.

On the other hand, it is possible to add elastic support members necessary for wiring on both sides of the existing elastic support members in the horizontal direction (tracking direction). This, however, causes an increase in size of the entire optical pickup.

SUMMARY OF THE INVENTION

The present invention aims to provide an optical pickup manufacturing method that enables a pair of elastic support member groups, which are each made up of three or more elastic support members arranged in parallel in the focusing direction, to be connected to the movable member and the fixed member by insert molding (i.e., to be inserted in the movable member and the fixed member).

The stated object can be achieved by a manufacturing method for an optical pickup in which a movable member carrying an objective lens is supported by a fixed member through a pair of elastic support member groups so as to be movable in a focusing direction and a tracking direction, each of the elastic support member groups being made up of a plurality of elastic support members arranged in parallel, including: a suspension unit forming step of forming, by insert molding, two holding members at different positions of each of the elastic support member groups in a lengthwise direction of the plurality of elastic support members so as to hold together the plurality of elastic support members, thereby forming a pair of suspension units, the holding members being made of a synthetic resin; and a connecting step of opposing the pair of suspension units to each other with an arrangement direction of the plurality of elastic support members being substantially same as the focusing direction, and connecting one holding member of each of the suspension units to the movable member and the other holding member of each of the suspension units to the fixed member.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings:

FIG. 2 shows part of manufacturing steps of the optical pickup according to the conventional manufacturing method;

FIG. 10A is a back view of the suspension unit;

FIG. 10B is a top view of the suspension unit;

FIG. 12 shows the positions of a pair of suspension units loaded in a mold in the insert molding process shown in FIG. 11, and the insert-molded enclosure and block with these suspension units as insert pieces;

FIG. 14 shows a process of bending a suspension unit;

FIG. 15 shows a pair of bent suspension units, and the insert-molded enclosure and block with these suspension units as insert pieces;

FIG. 17A is a perspective view showing a rough construction of an optical pickup according to the second embodiment of the invention;

FIG. 17B is a side view of the optical pickup shown in FIG. 17A;

FIG. 17C is a top view of the optical pickup shown in FIG. 17A;

FIG. 18 is a perspective view showing a rough construction of an optical pickup according to the third embodiment of the invention;

FIG. 21 shows connections between elastic support members and various components mounted on an enclosure, in the optical pickup shown in FIG. 18.

DESCRIPTION OF THE PREFERRED EMBODIMENTS

The following describes embodiments of the present invention with reference to the drawings.

(First Embodiment)

Figure 1:
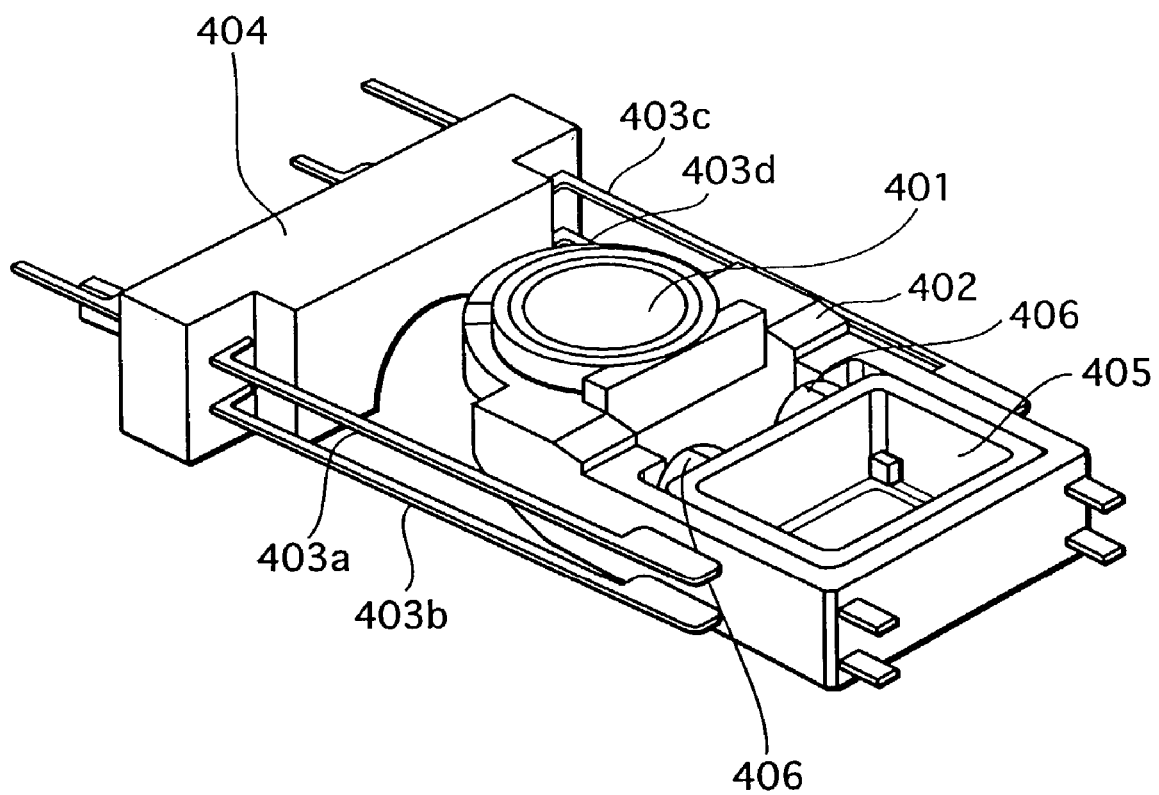
FIG. 1 is a perspective view showing a rough construction of an optical pickup according to a conventional manufacturing method.
Figure 3:
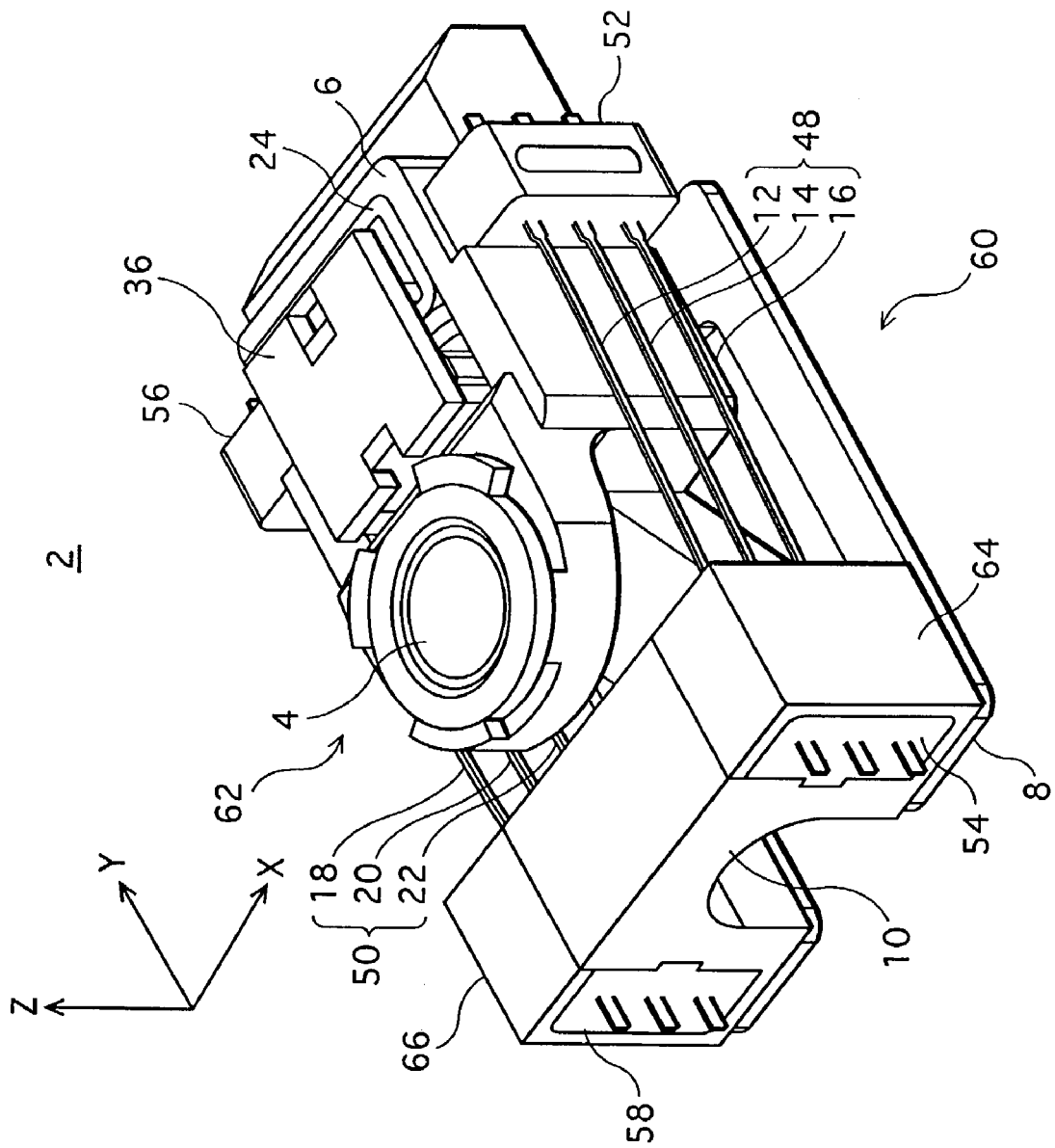
FIG. 3 is a perspective view showing a rough construction of an optical pickup according to the first embodiment of the invention.
Figure 4:
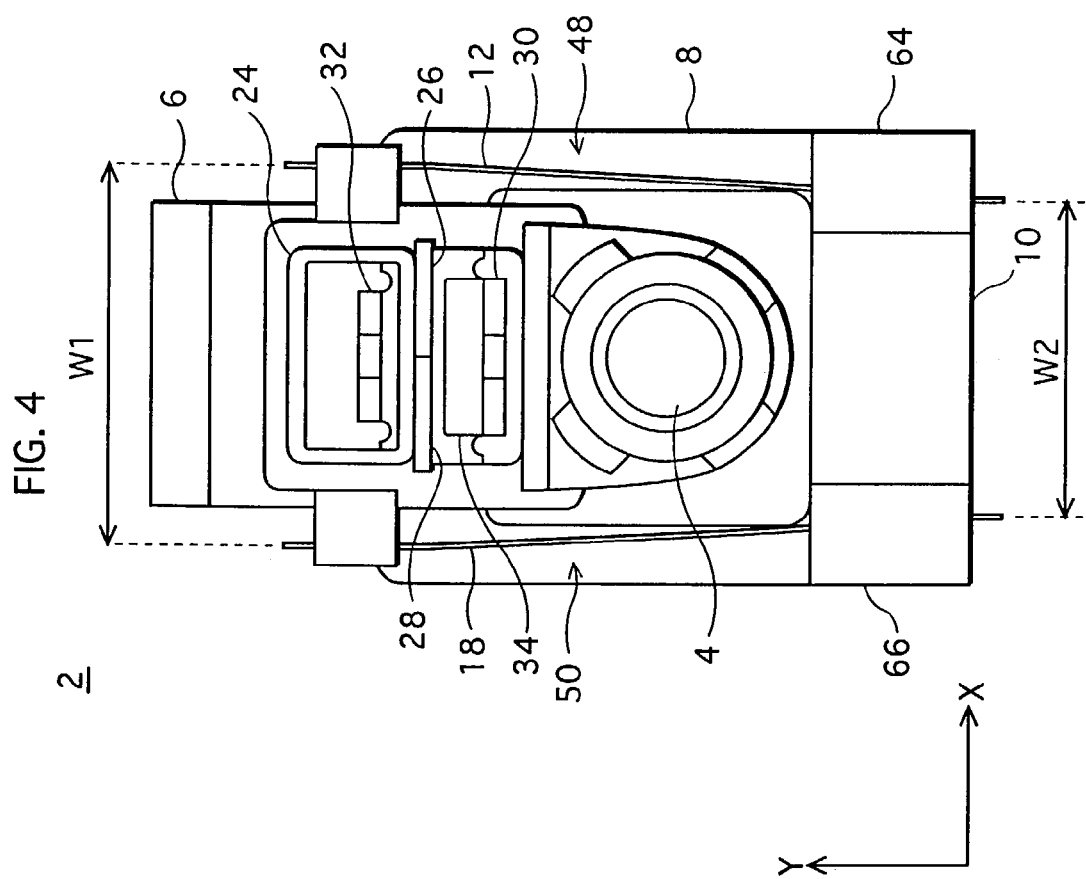
FIG. 4 is a top view of the optical pickup shown in FIG. 3.
Figure 5:
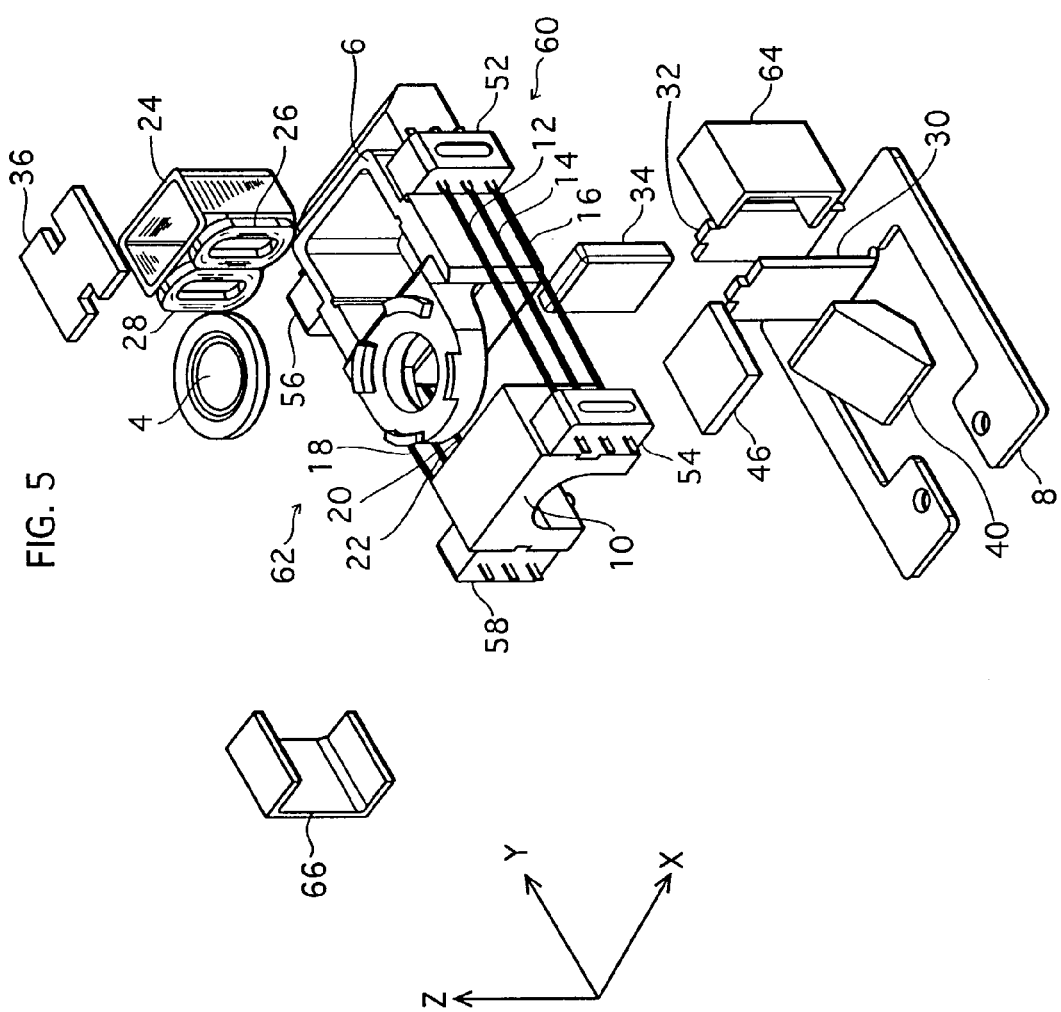
FIG. 5 is an exploded perspective view of the optical pickup shown in FIG. 3.

FIG. 3 is a perspective view showing a rough construction of an optical pickup 2 to which the first embodiment of the invention relates. FIG. 4 is a top view of the optical pickup 2, whereas FIG. 5 is an exploded perspective view of the optical pickup 2. Note that an auxiliary yoke 36 shown in FIG. 3 has been omitted in FIG. 4.

In this specification, a focusing direction denotes a direction of an optical axis of an objective lens, whereas a tracking direction denotes a direction intersecting a track of an optical recording medium (e.g. CD or DVD) which is subjected to recording/playback. In an XYZ orthogonal coordinate system in FIG. 3, the Z direction is the focusing direction and the X direction is the tracking direction.

The optical pickup 2 has an enclosure 6 which is movable and a block 10 which is fixed. The enclosure 6 is made of a resin, and carries optical components such as an objective lens 4 and a liquid crystal tilt correction component 46. The block 10 is equally made of the resin, and is fixed onto a base 8. The enclosure 6 and the block 10 are connected to each other by a plurality of elastic support members (six elastic support members 12, 14, 16, 18, 20, and 22 in this example) which are also called suspension wires. With the provision of these elastic support members 12, 14, 16, 18, 20, and 22, the enclosure 6 is supported by the block 10 so as to be movable in the tracking direction and in the focusing direction.

A focusing coil 24 and tracking coils 26 and 28 are attached to the enclosure 6 using an adhesive.

The base 8 is made of a magnetic material. The base 8 is partially bent to form yokes 30 and 32. A permanent magnet 34 shaped like a square plate is attached to a surface of the yoke 30 facing the other yoke 32 by adhesion. The permanent magnet 34 has the north pole and the south pole arranged in the direction of the thickness. As a result, a magnetic flux is generated in a direction (Y direction) that is orthogonal to both the focusing direction and the tracking direction, in a space between the permanent magnet 34 and the yoke 32.

The focusing coil 24 is shaped like a square tube. The focusing coil 24 is positioned so that one of its surfaces links with the magnetic flux. Accordingly, when the focusing coil 24 is energized, a force of driving in the focusing direction is generated. The two tracking coils 26 and 28 are each shaped like a square ring. The tracking coils 26 and 28 are arranged in the tracking direction (X direction) with one side of the tracking coil 26 facing one side of the tracking coil 28 as shown in FIG. 5, so that the facing sides link with the magnetic flux. Also, the tracking coils 26 and 28 are electrically connected in series, such that a current always flows through each of the facing sides in the same direction in the focusing direction (Z direction). Accordingly, when the tracking coils 26 and 28 are energized, a force of driving in the tracking direction is generated.

Also, the auxiliary yoke 36 is provided on the yokes 30 and 32, as shown in FIG. 3. The auxiliary yoke 36 is a magnetic plate for forming an efficient magnetic circuit.

Hereinafter, the optical components (the objective lens 4 and the liquid crystal tilt correction component 46), the focusing coil 24, the tracking coils 26 and 28, and the enclosure 6 are collectively called a movable member, whereas the base 8 and the block 10 are collectively called a fixed member. Note that the base 8 is fixed onto an optical base (not illustrated).

Figure 6:
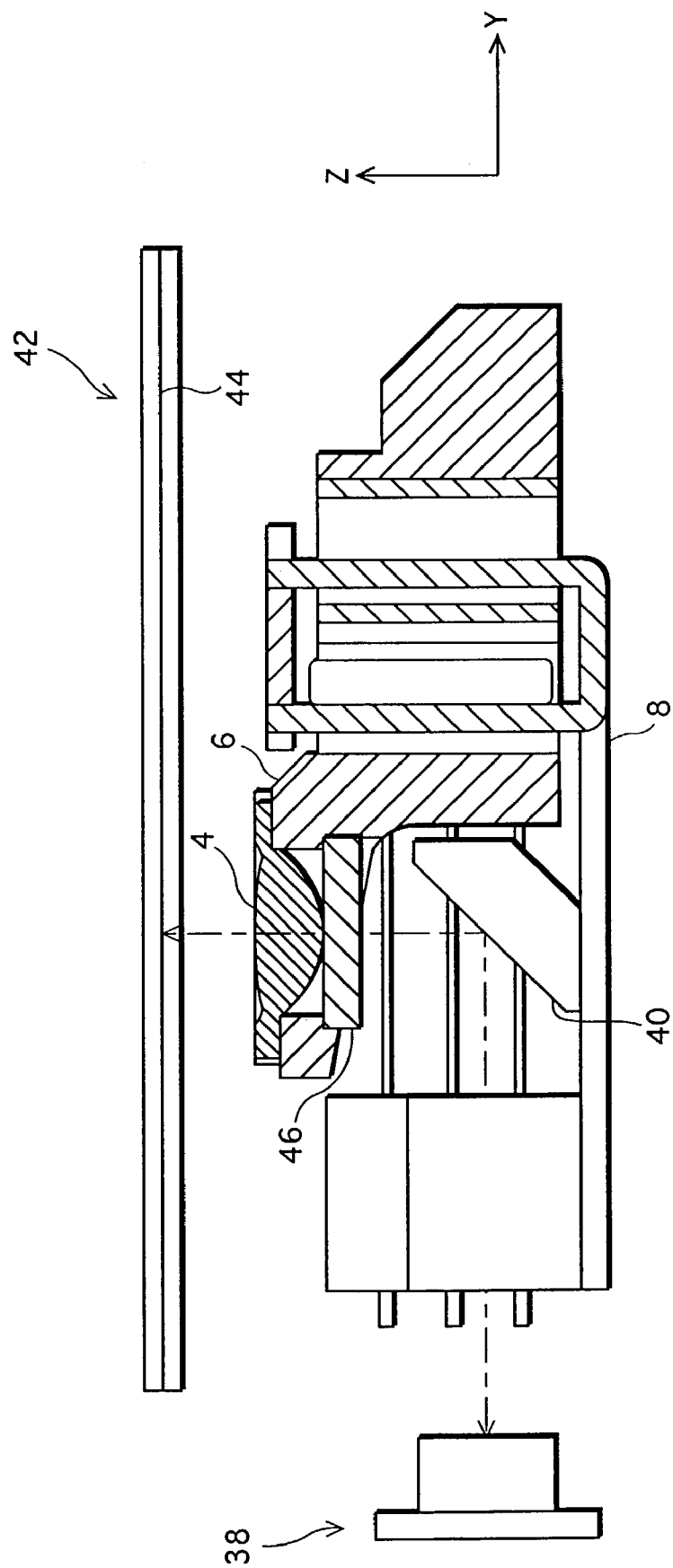
FIG. 6 is a longitudinal sectional view showing an optical path in the optical pickup shown in FIG. 3.

FIG. 6 is a longitudinal sectional view showing an optical path in the optical pickup 2.

A hologram module 38 is secured onto the optical base on which the base 8 is mounted. The hologram module 38 is equipped with a light emitting/receiving component and a diffraction grating (hologram optical component). A laser beam (indicated by the dashed lines) emitted from a light emitting component (semiconductor laser) in the hologram module 38 is reflected by a raising mirror 40 which is installed on the optical base. As a result, the chief ray enters the objective lens 4 substantially coaxially with the optical axis of the objective lens 4. This laser beam passes through the objective lens 4 and is focused onto an information recording surface 44 of an optical recording medium 42. Here, the liquid crystal tilt correction component 46 secured to the enclosure 6 is situated on the optical path between the raising mirror 40 and the objective lens 4.

The laser beam is reflected by the information recording surface 44, and the resulting return beam reverses along the same optical path. In other words, the return beam passes the objective lens 4 and the liquid crystal tilt correction component 46, and is reflected by the raising mirror 40, thereby entering the hologram module 38. The laser beam is received by a plurality of light receiving components in the hologram module 38. As a result, a servo signal, which includes a focusing error signal and a tracking error signal, and an information recorded signal are detected and sent to a control circuit (not illustrated).

The control circuit controls the amounts of currents supplied to the focusing coil 24 and the tracking coils 26 and 28, based on the focusing error signal and the tracking error signal. The control circuit also drives the liquid crystal in the liquid crystal tilt correction component 46 to change the wave aberration in the reflected light, in order to optimize the information recorded signal. Hence the wave aberration is put in an optically most favorable state.

Turning back to FIGS. 3 to 5, the three elastic support members 12, 14, and 16 are arranged in parallel with equal intervals, on one side of a plane (YZ plane) that includes the optical axis of the objective lens 4 and is substantially orthogonal to the tracking direction. Likewise, the three elastic support members 18, 20, and 22 are arranged in parallel with equal intervals, on the opposite side of the YZ plane. Here, the three elastic support members 12, 14, and 16 and the three elastic support members 18, 20, and 22 are positioned symmetrically with respect to the YZ plane. Also, the arrangement direction of the three elastic support members 12, 14, and 16 and the arrangement direction of the three elastic support members 18, 20, and 22 are the same as the focusing direction, as can be seen from FIG. 3.

Figure 7A:
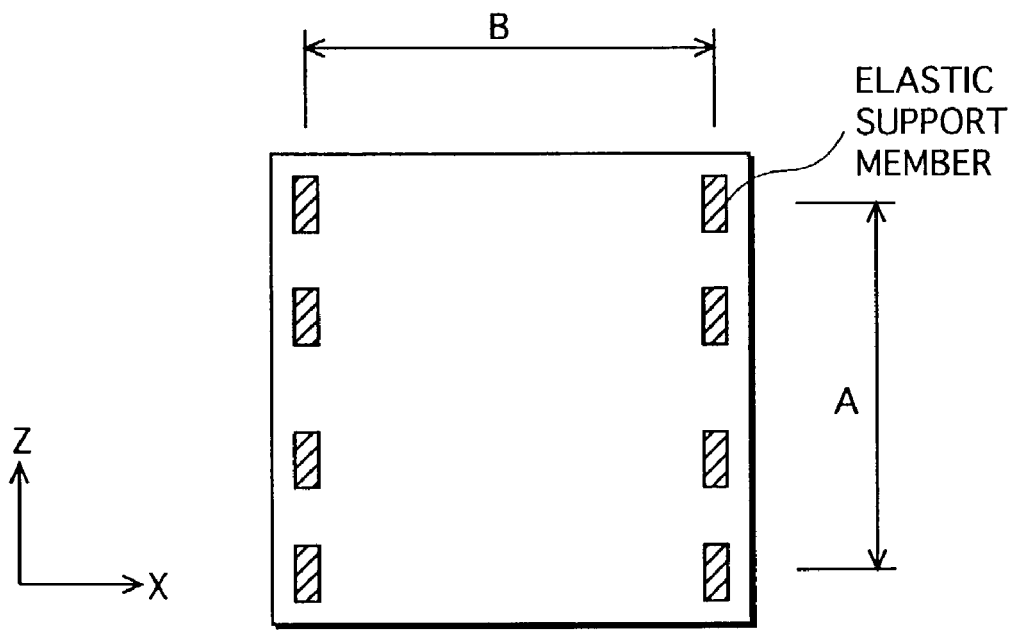
FIG. 7 shows different arrangements of elastic support members for comparison.
Figure 7B:
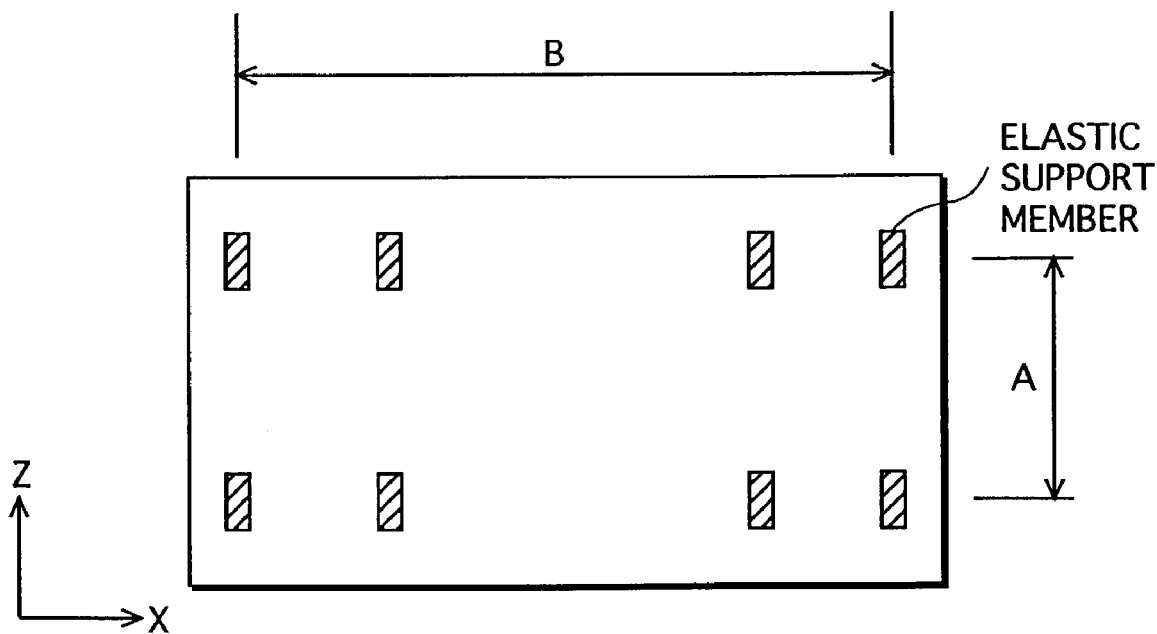

Though the number of elastic support members provided on each side of the YZ plane is three in this example, suppose four elastic support members are provided on each side. If the four elastic support members are arranged only in the focusing direction as shown in FIG. 7A, the entire optical pickup can be made compact (i.e. reduced in size in the tracking direction), when compared with the case where the four elastic support members are arranged in both the focusing direction and the tracking direction.

Also, if the four elastic support members are arranged only in the focusing direction, a quadrilateral formed by joining the outermost elastic support members together on the XZ plane is closer to a square than if the four elastic support members are arranged in both the focusing direction and the tracking direction. In other words, the ratio B/A is closer to 1, where A is the dimension of the elastic support member arrangement in the focusing direction and B is the dimension of the elastic support member arrangement in the tracking direction. This has an effect of keeping static tilt from occurring in low-frequency regions of driving signals of the focusing coil 24 and tracking coils 26 and 28. The tilt here refers to a circular movement of the movable member around an axis parallel to the Y axis.

Hereinafter, the three elastic support members 12, 14, and 16 are collectively called a first elastic support member group 48, whilst the three elastic support members 18, 20, and 22 are collectively called a second elastic support member group 50.

Both ends of the elastic support members 12, 14, and 16 that constitute the first elastic support member group 48 are held together by holding members 52 and 54. Likewise, both ends of the elastic support members 18, 20, and 22 that constitute the second elastic support member group 50 are held together by holding members 56 and 58. These holding members 52, 54, 56, and 58 are made of a synthetic resin. The first elastic support member group 48 and the second elastic support member group 50 are connected to both the enclosure 6 and the block 10 via these holding members 52, 54, 56, and 58. In other words, the holding members 52, 54, 56, and 58 serve as connectors for connecting the first elastic support member group 48 and the second elastic support member group 50 to both the enclosure 6 and the block 10. Hereinafter, an elastic support member group made up of a plurality of elastic support members (three elastic support members in this example) and a set of holding members (two holding members in this example) for holding together the elastic support members are collectively called a suspension unit. In FIG. 3, the first elastic support member group 48 and the holding members 52 and 54 constitute a suspension unit 60, whilst the second elastic support member group 50 and the holding members 56 and 58 constitute a suspension unit 62.

Each of the elastic support members 12, 14, 16, 18, 20, and 22 is formed from a material that not only has appropriate elasticity (springiness) for movably supporting the movable member in such directions as the tracking direction and the focusing direction, but also has conductivity. Examples of such a material include copper alloys like phosphor bronze, titanium copper, and beryllium copper. The reason for the elastic support members 12, 14, 16, 18, 20, and 22 needing to be conductive is that they are also used as electrical wires for supplying driving power to the focusing coil 24, tracking coils 26 and 28, and liquid crystal tilt correction component 46 equipped in the enclosure 6.

The elastic support members 12, 14, 16, 18, 20, and 22 have the same shape in cross section (rectangular). Also, the elastic support members 12, 14, 16, 18, 20, and 22 have the same span, that is, the same length from one holding member to the other. Let b be the width of one elastic support member (i.e. the length in the focusing direction), t be the thickness of one elastic support member (i.e. the length in the tracking direction), L be the span of one elastic support member, E be Young's modulus, n be the total number of elastic support members, and M be the total mass of members to be supported by the elastic support members (such as the enclosure 6). Since each elastic support member has the same cross section and the same span, the primary resonance frequency f0 of all of the elastic support members 12, 14, 16, 18, 20, and 22 is $$f0=(1/\pi)\times\{(n \cdot E \cdot b \cdot t^3)/(M \cdot L^3)\}^{1/2}$$

If the elastic support members 12, 14, 16, 18, 20, and 22 have different cross sections or different spans, a plurality of resonance points (resonance frequencies) unique to each elastic support member appear. In this embodiment, however, the elastic support members 12, 14, 16, 18, 20, and 22 are given the same cross section and the same span, with it being possible to limit the total number of primary resonance points (frequencies) to one point (f0).

Meanwhile, the distance between the first elastic support member group 48 and the second elastic support member group 50 in the tracking direction varies on the enclosure side and on the block side, as shown in FIG. 4. In this embodiment, the distance W1 between the first elastic support member group 48 and the second elastic support member group 50 on the enclosure side is greater than the distance W2 between the first elastic support member group 48 and the second elastic support member group 50 on the block side. Also, the first elastic support member group 48 and the second elastic support member group 50 are each slightly bent outward in the tracking direction on the enclosure side, as can be seen from FIG. 4. By such positioning the first elastic support member group 48 and the second elastic support member group 50 so as not to be parallel when looked at in the focusing direction, the rigidity of the elastic support members 12, 14, 16, 18, 20, and 22 against a force of tilting the movable member can be enhanced when compared with the case where the first elastic support member group 48 and the second elastic support member group 50 are positioned in parallel.

The two suspension units 60 and 62 are symmetrically situated with respect to a first plane that includes the center of gravity of the movable member and is orthogonal to the tracking direction (YZ plane which also includes the optical axis of the objective lens 4) Also, each of the suspension units 60 and 62 is symmetrical with respect to a second plane that includes the center of gravity of the movable member and is orthogonal to the focusing direction. In this example, an odd number of elastic support members (three elastic support members) are arranged in the focusing direction with equal intervals. This being so, the middle elastic support member 14 (20) lies on the second plane. Suppose an even number of elastic support members are arranged in the focusing direction with equal intervals. In such a case, a midline between the two middle elastic members lies on the second plane.

Therefore, the total number of elastic support members can be increased or decreased by two while maintaining the above symmetries with respect to the first and second planes.

By contrast, the conventional manufacturing method described in the Related Art section only allows the total number of elastic support members to be increased or decreased by four. Thus, this embodiment can respond to an increase/decrease in the number of electrical/electronic components equipped in the enclosure more sensitively than the conventional method. Hence the possibility of equipping the optical pickup with redundant elastic support members is reduced.

The holding members 54 and 58 on the block side are enclosed with gel retention members 64 and 66 shaped like the Japanese katakana letter "コ", respectively. The gel retention members 64 and 66 are longer in the Y direction than the holding members 54 and 58. The spaces surrounded by the inner surfaces of the gel retention members 64 and 66, the side faces of the block 10 in the tracking direction (X direction), and the surfaces of the holding members 54 and 58 facing the holding members 52 and 56 are each packed with a vibration suppression member made of a gel material (not illustrated). Which is to say, the parts at which the elastic support members 12, 14, 16, 18, 20, and 22 are supported by the holding members 54 and 58 are covered with the vibration suppression members. This has an effect of suppressing sympathetic vibrations of the elastic support members 12, 14, 16, 18, 20, and 22 and the movable member.

A method of manufacturing the optical pickup 2 having the above construction is explained below.

FIG. 8 shows a process of forming a suspension unit.

Figure 8B:
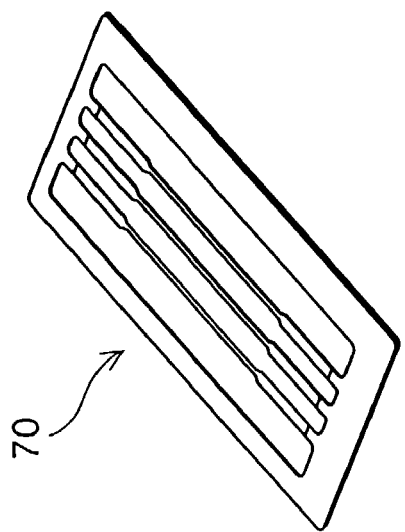
FIG. 8 shows a process of forming a suspension unit.
Figure 8A:
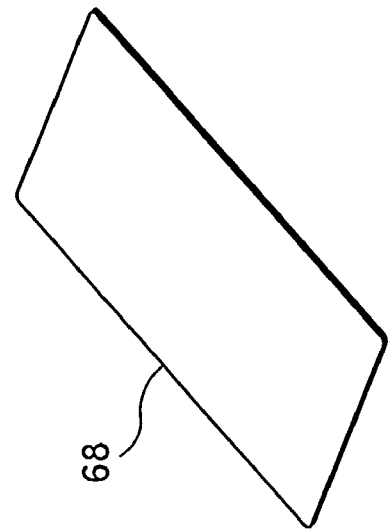
Figure 8D:
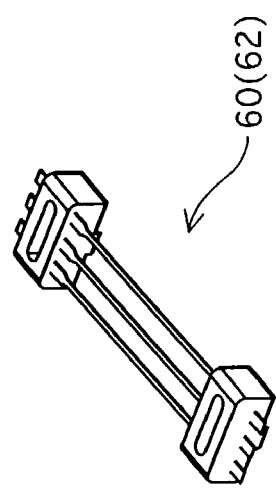

In FIG. 8A, a flat rectangular plate 68 with the thickness t is prepared as a raw material for elastic support members. This plate 68 is made of the aforementioned material of the elastic support members 12, 14, 16, 18, 20, and 22.

The plate 68 is pressed into a form shown in FIG. 8B. In detail, stripe holes extending in the direction of the length of the plate 68 are made through the plate 68 to create line parts in the form of stripes which are to become the elastic support members. At this time, the line parts are joined together on the edge parts of the length of the plate 68 at both ends.

Here, the plate 68 may be shaped into the form shown in FIG. 8B by etching instead of by press working. In this case, the plate 68 is corroded to make stripe holes, thereby obtaining the form shown in FIG. 8B.

This construction in which stripe holes are made through the plate 68 to form a plurality of elastic support members in stripes that are joined together on the edge parts of the plate 68 is called a suspension sheet 70.

Next, holding members are formed by insert molding (this process is hereafter referred to as a first molding process). In more detail, the suspension sheet 70 is placed into a mold equipped in an upright injection molding machine (not illustrated). After clamping, a molten resin is injected into mold cavities to form the holding members. Here, the mold is a so-called two-piece mold that is made up of upper and lower mold halves. The upper and lower mold halves open/close in a direction substantially orthogonal to the suspension sheet 70 which is placed in the mold.

FIG. 9 shows the first molding process. The drawing is a rough cross section of the mold cut across one of the mold cavities.

Figure 9D:
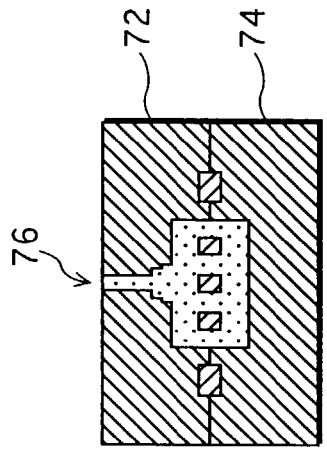
FIG. 9 shows an insert molding process in the suspension unit forming process.
Figure 9E:
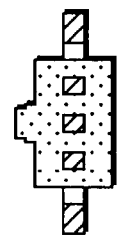
Figure 9A:
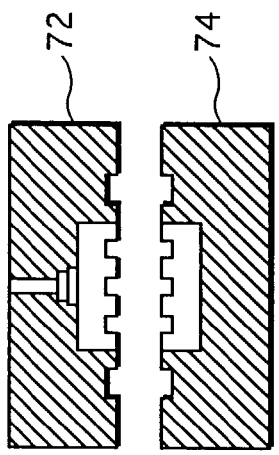
Figure 9B:
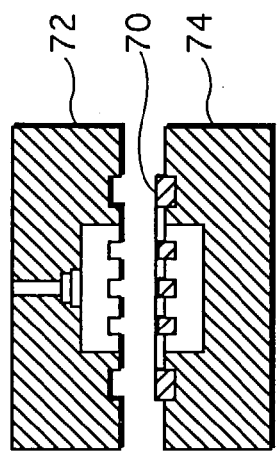
Figure 9C:
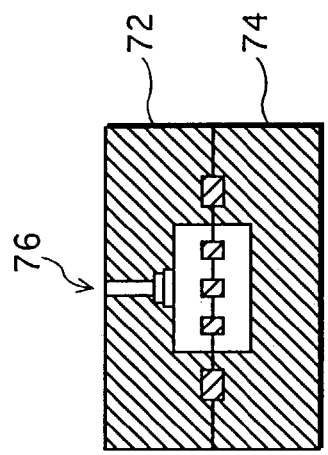

The upper mold half 72 and the lower mold half 74 are held opened in the vertical direction (FIG. 9A). In this state, the suspension sheet 70 is loaded onto the lower mold half 74 (FIG. 9B).

Figure 8C:
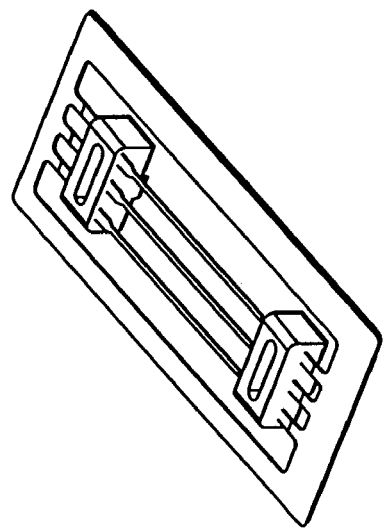

After clamping (FIG. 9C), that is, after the upper mold half 72 and the lower mold half 74 are closed to sandwich the suspension sheet 70, a molten resin is injected into the mold cavity through a gate 76 provided in the upper mold half 72 (FIG. 9D). After a predetermined cooling period, the upper mold half 72 and the lower mold half 74 are opened and the molded piece shown in FIG. 8C is taken out (FIG. 9E). Then the outer frame is cut away (removed) from the molded piece to complete the suspension unit 60 (62).

As described above, holding members are formed by insert molding whereby the suspension sheet 70 having the plurality of parallel-arranged elastic support members is sandwiched between the upper mold half 72 and the lower mold half 74 as an insert piece. According to this method, the formation of holding members is possible irrespective of whether the number of elastic support members is two, three, or four or more. This makes it easier to respond to the need for more elastic support members which arises as a result of an increase in the number of electrical/electronic components equipped in the enclosure (movable member), as in the case of the third embodiment.

FIG. 10A is a back view of the suspension unit 60, whereas FIG. 10B is a top view of the suspension unit 60. The suspension units 60 and 62 have the same construction and differ only in their orientations with respect to the enclosure 6 and the block 10. Accordingly, an explanation on the suspension unit 62 has been omitted here.

As shown in FIGS. 10A and 10B, the holding members 52 and 54 have the same shape that is substantially a parallelepiped. The holding members 52 and 54 respectively have long holes 52H and 54H in the direction of the length. Also, the holding members 52 and 54 respectively have a pair of projections 52A and 52B and a pair of projections 54A and 54B, on one side surface of the parallelepiped at the center in the direction of the length.

Furthermore, the suspension unit 60 is formed so as to be symmetrical with respect to the second plane that is orthogonal to the focusing direction in the assembled optical pickup 2, as explained earlier.

Here, it should be obvious that the mold used in the above first molding process has two mold cavities corresponding to the holding members 52 and 54. Also, the mold has four gates whose positions correspond to the projections 52A, 52B, 54A, and 54B of the molded piece (the holding members 52 and 54). Which is to say, the positions of the gates correspond to the center of the molded piece in the direction of the length of the parallelepiped (holding members 52 and 54) which lies on the second plane, that is, the symmetry center of the molded piece in the arrangement direction of the elastic support members. This being so, the injected resin flows symmetrically with respect to these gates (indicated by the arrows shown in FIG. 10A). As a result, internal distortions and internal stresses remaining after the resin has been cooled are symmetrically distributed. This enables stable vibration properties to be achieved in both the focusing direction and the tracking direction.

Also, the two ends of the elastic support member 12 (14, 16) are connected with the holding members 52 and 54 at different positions in the direction of the thickness, as can be seen from FIG. 10B. This is because the elastic support member 12 is bent in a curved form between the holding members 52 and 54, as described later.

The following describes a process of forming the enclosure 6 and the block 10 while combining the suspension units 60 and 62 with the enclosure 6 and the block 10.

The enclosure 6 and the block 10 are formed by injection molding. In detail, the enclosure 6 and the block 10 are formed by insert molding with the holding members 52 and 54 of the suspension unit 60 and the holding members 56 and 58 of the suspension unit 62 as insert pieces (this process is hereafter referred to as a second molding process).

This injection molding (second molding process) uses an upright injection molding machine and a two-piece mold, like the first molding process. The mold has two mold cavities corresponding to the enclosure 6 and the block 10.

FIG. 11 shows the process of molding the enclosure 6 and the block 10. FIGS. 11A–11D are each a rough cross section of the mold cut across the mold cavity corresponding to the block 10.

Figure 11D:
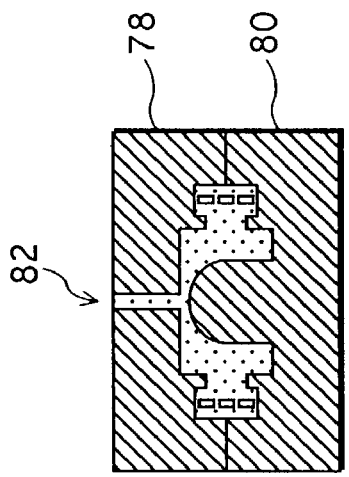
FIG. 11 shows an insert molding process for molding an enclosure and a block.
Figure 11E:
Figure 11A:
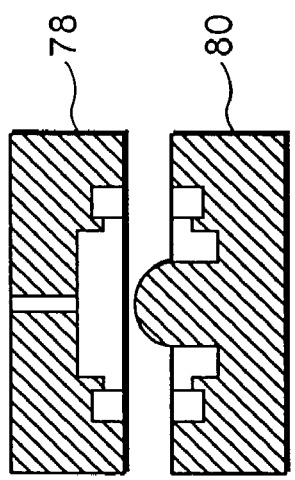
Figure 11B:
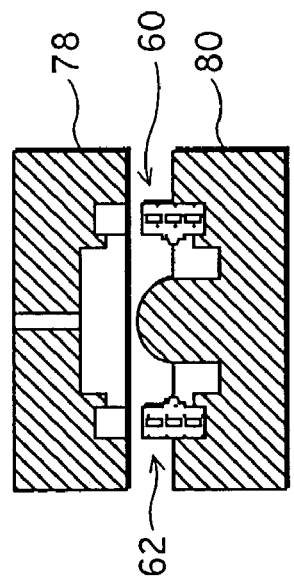
Figure 11C:
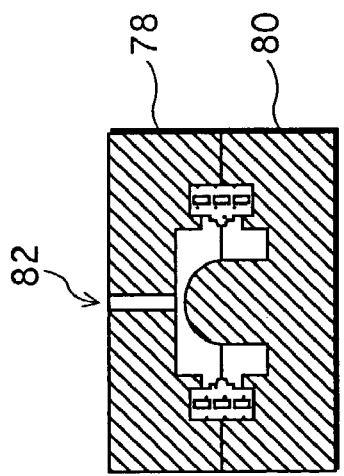
Figure 13B:
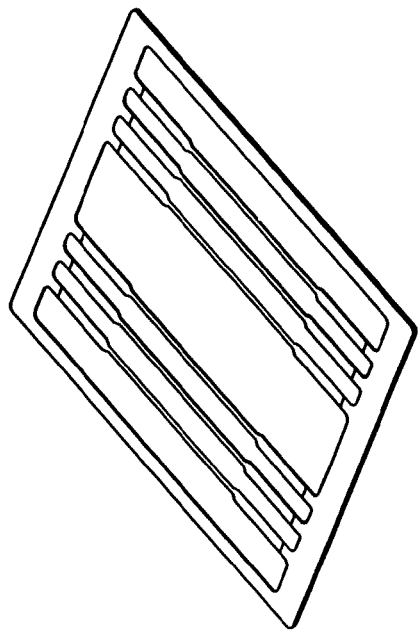
FIG. 13 shows another suspension unit forming process.
Figure 13A:
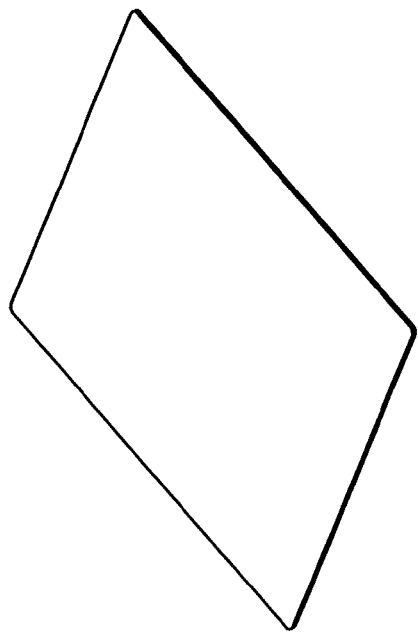
Figure 13D:
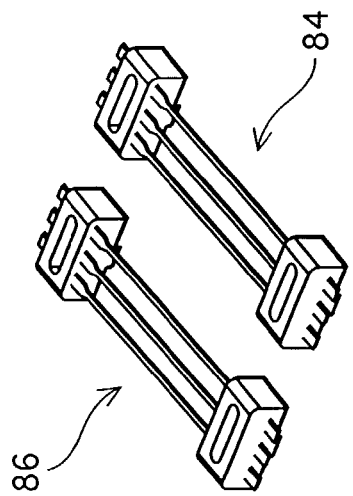
Figure 13C:
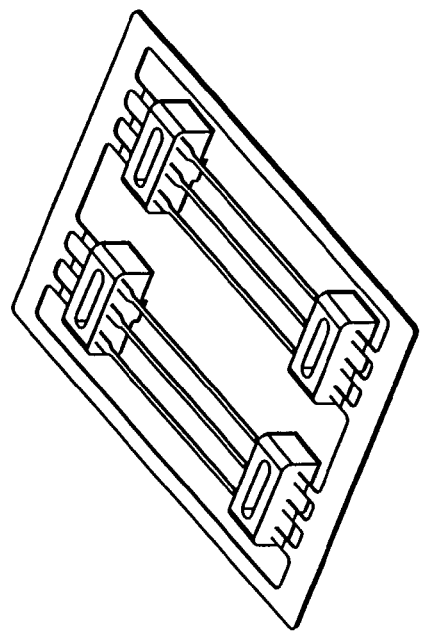

The upper mold half 78 and the lower mold half 80 are held opened in the vertical direction (FIG. 11A). In this state, the pair of suspension units 60 and 62 are loaded onto the lower mold half 80 (FIG. 11B). When doing so, the suspension units 60 and 62 are oriented so that their projections (such as 52A) all face in an inward direction in the mold cavity. That is to say, the suspension units 60 and 62 are oriented so that the projections 56A and 56B face the projections 52A and 52B and the projections 58A and 58B face the projections 54A and 54B, as shown in FIG. 12A (the projections 52A and 52B and the projections 54A and 54B are not shown in FIG. 12A). Thus, the suspension units 60 and 62 are opposed to each other with the arrangement direction of the elastic support members 12, 14, and 16 and the arrangement direction of the elastic support members 18, 20, and 22 being the same as the focusing direction. Also, each of the suspension units 60 and 62 is set so that both holding members have their side surfaces flush with each other (as indicated by the dashed lines in FIG. 12A). In other words, the mold is designed to realize such setting of each of the suspension units 60 and 62. This results in a configuration where the elastic support members 12, 14, and 16 between the holding members 52 and 54 are nonparallel with the elastic support members 18, 20, and 22 between the holding members 56 and 58 when looked at in the focusing direction.

After clamping (FIG. 11C), a molten resin is injected into the mold cavity through a gate 82 provided in the upper mold half 78 (FIG. 11D). After a predetermined cooling period, the upper mold half 78 and the lower mold half 80 are opened and the molded piece shown in FIG. 12B is taken out (FIG. 11E).

In the above injection process, the resin enters into the long holes 52H, 54H, 56H, and 58H of the respective holding members 52, 54, 56, and 58 (FIG. 12A) and also surrounds the projections 52A, 52B, 54A, 54B, 56A, 56B, 58A, and 58B. As a result, the holding members 52 and 56 are firmly connected to the enclosure 6, whilst the holding members 54 and 58 are firmly connected to the block 10. Here, it has been confirmed that the necessary connection strength can still be achieved even if these long holes are not present. In other words, the necessary connection strength can be achieved by appropriately roughening the surfaces of the holding members 52, 54, 56, and 58 to be connected to the enclosure 6 or the block 10. To further enhance the connection strength, the surfaces may be appropriately roughened with matte.

Turning back to FIG. 5, once the suspension units 60 and 62 have been combined with the enclosure 6 and the block 10 in the above way, various components are installed in this construction. In more detail, the objective lens 4, the focusing coil 24, the tracking coils 26 and 28, the liquid crystal tilt correction component 46, and the like are secured to the enclosure 6 by adhesion or similar. Having done so, one end of the conductor of the focusing coil 24 and one end of the conductor of the series-connected tracking coils 26 and 28 are each soldered to the enclosure end of a different one of the elastic support members 12, 14, 16, 18, 20, and 22. Also, each terminal of the liquid crystal tilt correction component 46 is electrically connected to the enclosure end of a different one of the elastic support member 12, 14, 16, 18, 20, and 22 via a lead wire (not illustrated).

Meanwhile, the gel retention members 64 and 66 are connected to the block 10 using an adhesive. After this, a vibration suppression member made of a gel is packed in each of the spaces formed by the gel retention members 64 and 66, the holding members 54 and 58, and the block 10.

The permanent magnet 34 is stuck to the yoke 30, and the base 8 on which the yoke 30 is formed is fixed onto the optical base. Optical components such as the hologram module 38 (FIG. 6), the raising mirror 40, and, if necessary, a polarizing beam splitter (not illustrated) are secured to the optical base at predetermined positions.

The block 10 is mounted on the base 8 that is fixed on the optical base. Furthermore, the auxiliary yoke 36 is installed to complete the optical pickup 2.

The present invention has been described by way of the first embodiment, though the first embodiment is not a limit for the invention. For example, the following modifications are possible.

(1) The first embodiment describes the case where one suspension unit is formed in one injection molding (first molding process) (FIG. 8), but the invention is not limited to this. For instance, two suspension units 84 and 86 may be formed in one injection molding, as shown in FIG. 13. A mold used in this case basically has the same construction as that used in the first embodiment, except that the number of mold cavities increases with the increase in the number of holding members to be molded. The process of the molding is basically the same as that shown in FIGS. 8 and 9 too, so that its explanation has been omitted here.

Alternatively, three or more suspension units may be formed in one inject molding, to further improve the manufacturability of suspension units.

(2) Each suspension unit may be shaped like a suspension unit 88 shown in FIG. 14B. In this suspension unit 88, each elastic support member 90 is bent between two holding members 89 and 91 to assume an angled form.

Such a suspension unit 88 can be obtained as follows. Once the suspension unit 88 shown in FIG. 14A has been formed as a result of the insert molding and the frame removal, each elastic support member 90 is bent at an appropriate point as shown in FIG. 14B, before the suspension unit 88 is loaded in the mold for molding the enclosure 6 and the block 10. This bending can be done using a press. Here, each elastic support member 90 may be bent to assume a curved form instead of an angled form.

FIG. 15A shows a pair of suspension units 88 which are bent in an angled form, and FIG. 15B shows the enclosure 6 and the block 10 which are insert-molded with these suspension units 88 as insert pieces.

Though not shown in FIG. 15B, the gel retention members are bonded to the holding members 91 and the vibration suppression members made of a gel are packed in the spaces formed by the gel retention members, the holding members 91, and the block 10, as in the first embodiment. Therefore, the bent parts of the suspension units 88 are covered with the vibration suppression members. These bent parts deliver an effect of suppressing higher sympathetic vibrations, together with the surrounding vibration suppression members.

(3) In addition to the above (2), the elastic support members may be bent in an angled form when the suspension unit is looked at in the tracking direction.

Figures 16A, 16B:
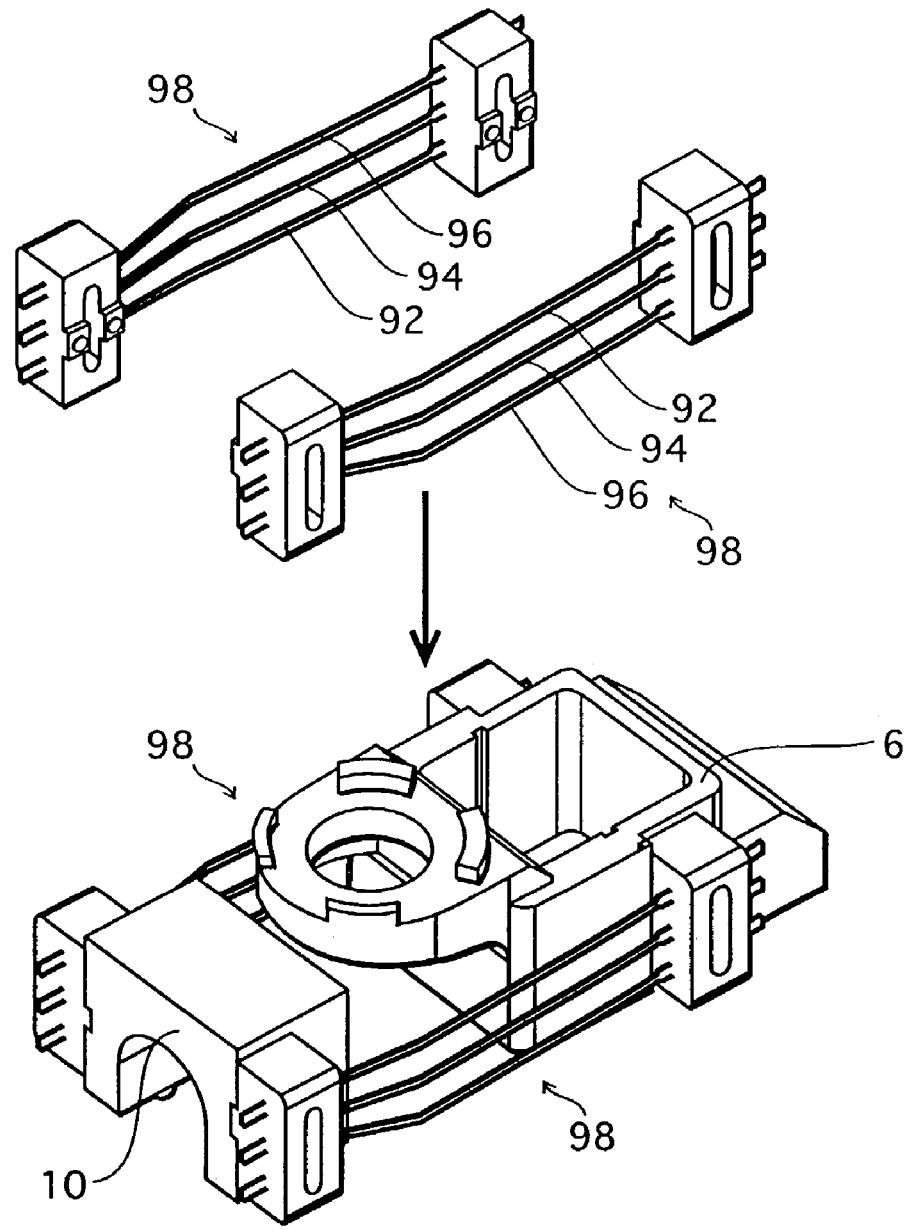
FIG. 16 shows another example of a pair of bent suspension units, and the insert-molded enclosure and block with these suspension units as insert pieces.

On example of this is shown in FIG. 16. In each of a pair of suspension units 98 shown in FIG. 16A, the block ends of the upper and lower elastic support members 92 and 96 are partly bent in an angled form toward the middle elastic support member 94. Such bending can be made when forming a suspension sheet from a plate. In more detail, stripe holes are made through the plate so that elastic support members (elastic support members 92 and 96) on both sides of an arrangement center (elastic support member 94) of a plurality of elastic support members (three elastic support members) formed in stripes are partly bent toward the arrangement center. In this example, the arrangement center is one middle elastic support member since the number of elastic support members is odd. If the number of elastic support members is even, on the other hand, the arrangement center is a midline between two middle elastic support members. In such a case, all elastic support members are partly bent toward that midline.

Here, the elastic support members may be bent in a curved form instead of in an angled form.

As a result of bending the elastic support members when the suspension unit is looked at in the tracking direction as well as when the suspension unit is looked at in the focusing direction, the elastic support members are three-dimensionally deformed. These deformed parts exhibit a greater effect of suppressing higher sympathetic vibrations of the elastic support members and the movable member, together with the surrounding vibration suppression members.

FIG. 16B shows the enclosure 6 and the block 10 which are insert-molded with the suspension units 98 as insert pieces. Note that the gel retention members and the vibration suppression members are omitted in this drawing too.

(Second Embodiment)

The second embodiment of the present invention has basically the same construction as the first embodiment, and differs only in the construction of a suspension unit. Accordingly, the following description focuses on the suspension unit, while omitting the same features as those of the first embodiment.

FIG. 17A is a perspective view showing a rough construction of an optical pickup 102 to which the second embodiment relates. FIG. 17B is a side view of the optical pickup 102 as seen in the tracking direction. FIG. 17C is a top view of the optical pickup 102 as seen in the focusing direction. Note that the auxiliary yoke, the gel retention members, and the vibration suppression members made of a gel are omitted in these drawings.

In this embodiment, each of a pair of suspension units 104 and 106 has the following construction, as shown in FIG. 17. In the suspension unit 104, the ends of three elastic support members 108, 110, and 112 connected to holding members 120 and 122 are staggered in such a manner that the connecting ends of the middle elastic support member 110 are not in line with those of the upper and lower elastic support members 108 and 112. In the suspension unit 106, the ends of three elastic support members 114, 116, and 118 connected to holding members 124 and 126 are staggered in such a manner that the connecting ends of the middle elastic support member 116 are not in line with those of the upper and lower elastic support members 114 and 118. Note here that all of the elastic support members 108, 110, 112, 114, 116, and 118 have the same span L.

The suspension unit 104 is symmetrical with respect to the plane (XY plane) that includes the center of the middle elastic support member 110 in the direction of the length and is parallel with the tracking direction, as in the first embodiment. Likewise, the suspension unit 106 is symmetrical with respect to the XY plane that includes the center of the middle elastic support member 116 in the direction of the length and is parallel with the tracking direction.

By staggering the connecting ends of the elastic support members in the direction (Y direction) orthogonal to the tracking direction while maintaining the above symmetries, circular movements of the movable member such as pitching and yawing can be suppressed. Pitching referred to here is a circular movement of the movable member around an axis θx that passes near the enclosure connecting ends of the two elastic support member groups and is parallel with the tracking direction. Yawing is a circular movement of the movable member around an axis θz that passes a midpoint between the enclosure connecting ends of the two elastic support member groups and is parallel with the focusing direction.

This effect can still be achieved even if only the enclosure connecting ends of the elastic support members are staggered. However, not only the enclosure connecting ends but also the block connecting ends of the elastic support members are staggered in this embodiment, for the following reason. By staggering the block connecting ends according to the stagger of the enclosure connecting ends in the above way so that all elastic support members have the same span, the total number of primary resonance points (frequencies) of the elastic support members can be limited to one point (f0), as in the first embodiment.

Such a staggered configuration in each of the suspension units 104 and 106 can be achieved in the injection molding process for the suspension unit (first molding process). A mold used in this case is basically of the same construction as that of the first embodiment, and so its explanation has been omitted here.

In this embodiment, the connecting ends of the elastic support members are staggered in the above way. Accordingly, the following techniques are employed in the second molding process to enable the enclosure and the block to be molded easily without having to use a complex mold.

The holding members 120, 122, 124, and 126 are hook-shaped when looked at in the focusing direction (FIG. 17C), in order to provide gaps 132, 134, 136, and 138 between the parts enclosed by the dotted boxes in FIGS. 17B and 17C (i.e. the parts related to the staggered connecting ends) and the enclosure 128 or the block 130.

In more detail, the mold used in the second molding process occupies the areas corresponding to the gaps 132, 134, 136, and 138, so that the gaps 132, 134, 136, and 138 are formed when the enclosure 128 and the block 130 are molded as a result of the second molding process. In this way, a resin which is injected to mold the enclosure 128 is kept from leaking from the depression of the holding member 120 (124) shown in FIG. 17B (around the enclosure connecting end of the middle elastic support member 110 (116)).

Hence the second molding process can be carried out using a simple two-piece mold, as in the first embodiment.

(Third Embodiment)

In the third embodiment of the present invention, more electrical/electronic components are mounted on the enclosure (movable member) than in the first embodiment. Accordingly, more elastic support members are provided to respond to the need for more wires.

Figure 19:
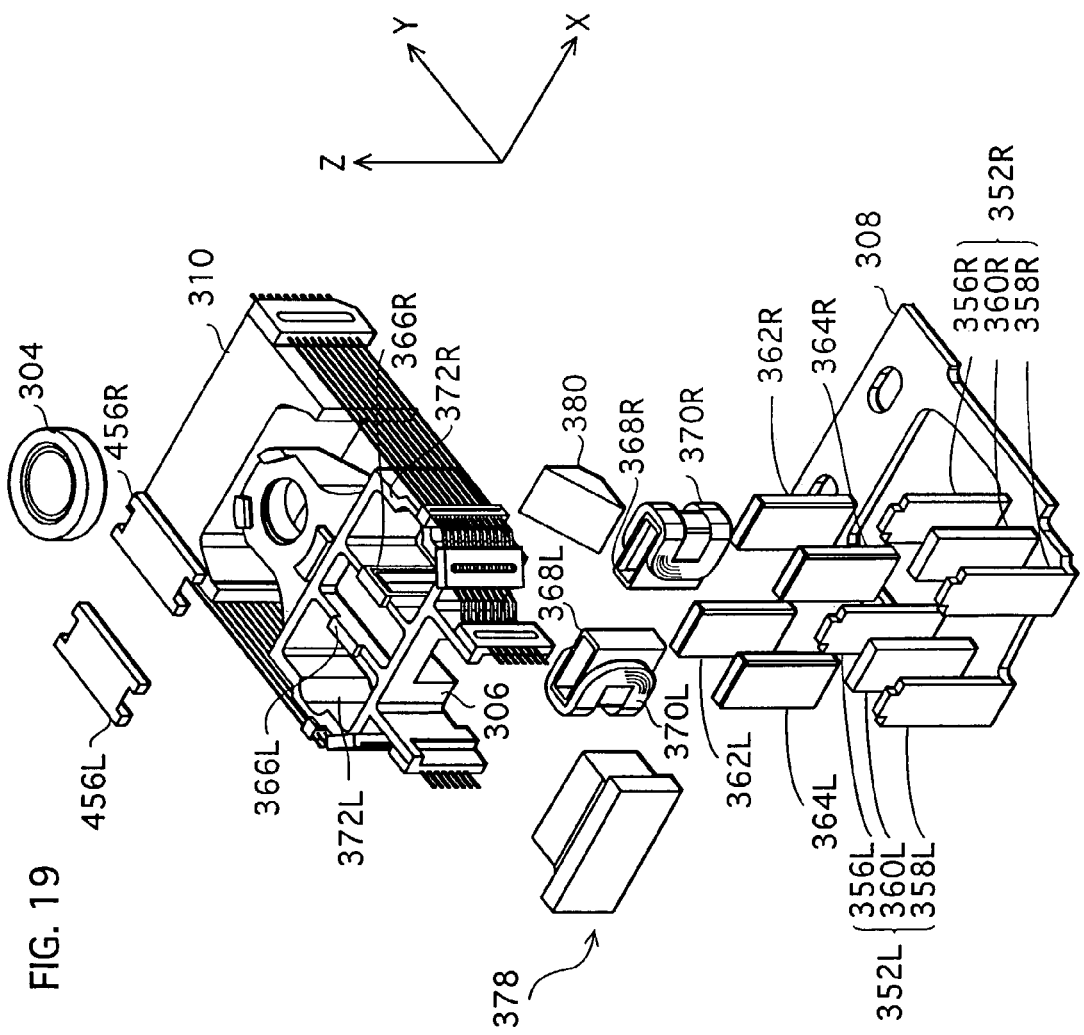
FIG. 19 is an exploded perspective view of the optical pickup shown in FIG. 18.

FIG. 18 is a perspective view of an optical pickup 302 to which the third embodiment relates. FIG. 19 is an exploded perspective view of the optical pickup 302. Note that auxiliary yokes 356R and 356L shown in FIG. 19 are omitted in FIG. 18.

Figure 20:
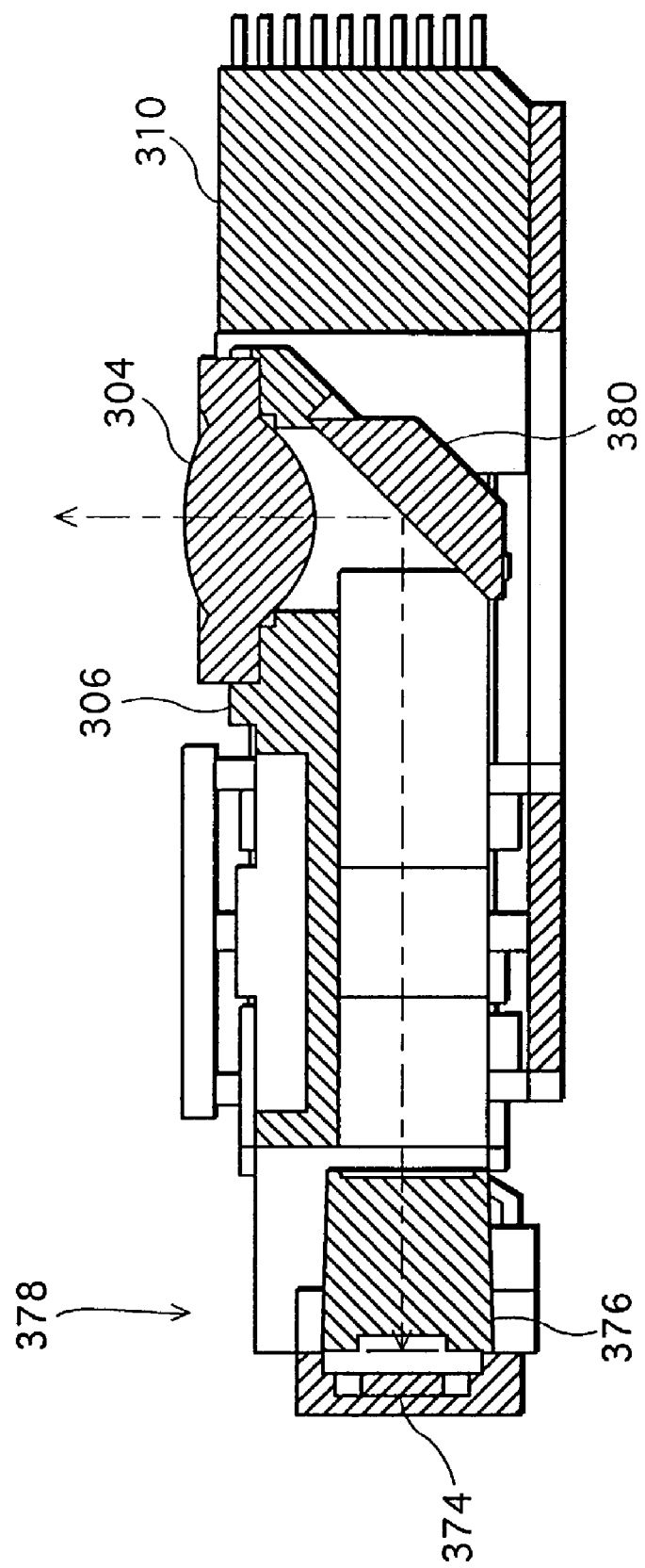
FIG. 20 is a longitudinal sectional view showing an optical path in the optical pickup shown in FIG. 18.

This optical pickup 302 is a so-called optical-component-integrated optical pickup. Which is to say, the optical pickup 302 has an enclosure 306 which is movable and a block 310 which is fixed. The enclosure 306 is made of a resin, and carries all optical components of an optical system including a semiconductor laser and an objective lens 304 (FIG. 20). The block 310 is equally made of the resin, and is fixed onto a base 308. The enclosure 306 and the block 310 are connected by a plurality of elastic support members (twenty elastic support members in this embodiment) which are also called suspension wires. Hereinafter, the optical system and the enclosure 306 are collectively called a movable member, whereas the base 308 and the block 310 are collectively called a fixed member.

According to this construction, the movable member including the optical system and the enclosure 306 is supported by the fixed member including the base 308 and the block 310, so as to be movable in the tracking direction and the focusing direction.

A pair of actuators 354R and 354L are provided on both sides of a plane (YZ plane) that includes the optical axis of the objective lens 304 and is orthogonal to the tracking direction, so as to be symmetrical with respect to the YZ plane. The actuators 354R and 354L respectively include E-shaped yokes 352R and 352L which are made of a magnetic material. The auxiliary yokes 456R and 456L are attached on top of these E-shaped yokes 352R and 352L, respectively. The auxiliary yokes 356R and 356L are magnetic plates for forming efficient magnetic circuits. Though the two actuators 354R and 354L are distinguished by the letter symbols "R" and "L", they have the same construction and therefore their corresponding construction elements are referred to by the same reference numerals. Also, since the actuators 354R and 354L have the same construction, they are simply referred to by the same reference numeral "354" when there is no need to distinguish them.

Each E-shaped yoke 352 is formed on the base 308. In more detail, each E-shaped yoke 352 has two outer yokes 356 and 358 and one middle yoke 360 secured onto the base 308 by adhesion. Permanent magnets 362 and 364 are attached to the facing surfaces of the outer yokes 356 and 358 with the same pole (north pole in this embodiment) pointing the other yoke, thereby forming a magnetic circuit. Each E-shaped yoke 352 is oriented so that the outer yoke 356, the middle yoke 360, and the outer yoke 358 are arranged in the Y direction, to thereby generate a magnetic flux in the Y direction (direction orthogonal to the tracking direction). Also, the E-shaped yokes 352R and 352L are set symmetrically with respect to the YZ plane.

Focusing coils 368R and 368L of tubular form are mounted on the enclosure 306 via coil mount members 366R and 366L. These focusing coils 368R and 368L are provided so that the middle yokes 360R and 360L of the E-shaped yokes 352R and 352L are respectively inserted in the focusing coils 368R and 368L with some clearance.

Also, tracking coils 370R and 370L are stuck to the sides of the focusing coils 368R and 368L that are opposite to the sides attached to the coil mount members 366R and 366L. The tracking coils 370R and 370L have the shape of the Japanese katakana letter "コ" when looked at in the focusing direction. The tracking coils 370R and 370L are also stuck to frame parts 372R and 372L of the enclosure 306 using an adhesive. When looked at in the focusing direction, both ends of each tracking coil 370 are situated between the outer yoke 356 and the middle yoke 369 and between the outer yoke 358 and the middle yoke 360 of the E-shaped yoke 352.

Thus, each actuator 354 includes an E-shaped yoke 352 having magnets 362 and 364, a focusing coil 368, and a tracking coil 370. With the provision of such actuators 354, the movable member can be driven in the focusing direction and the tracking direction.

In greater detail, the E-shaped yoke 352 having the magnets 362 and 364 generates a first magnetic flux directed from the outer yoke 356 to the middle yoke 360 and a second magnetic flux directed from the outer yoke 358 to the middle yoke 360 (opposite in direction to the first magnetic flux). The focusing coil 368 is provided so as to link with the first and second magnetic fluxes, as the middle yoke 360 is inserted in the focusing coil 368 with some clearance. Accordingly, when the focusing coil 368 is energized, a current flows in the X direction in the parts of the focusing coil 368 between the outer yoke 356 and the middle yoke 360 and between the outer yoke 358 and the middle yoke 360. This produces a force of driving in the focusing direction. Meanwhile, when the tracking coil 370 is energized, a current flows in the Z direction at both ends of the tracking coil 370 shaped like the Japanese katakana letter "コ". This produces a force of driving in the tracking direction.

Here, the focusing coils 368R and 368L are electrically connected in series so as to produce a driving force of the same direction when energized. Equally, the tracking coils 370R and 370L are electrically connected in series so as to produce a driving force of the same direction when energized.

FIG. 20 is a longitudinal sectional view showing the optical components mounted on the enclosure 306.

A hologram module 378 is fixed to the enclosure 306. The hologram module 378 is similar to that of the first embodiment, including a light emitting/receiving component substrate 374, on which a light emitting component and a plurality of light receiving components (not illustrated) are provided, and a hologram optical component 376. A laser beam (indicated by the dashed lines) emitted from the light emitting component (semiconductor laser) in the hologram module 378 is reflected by a raising mirror 380 which is installed on the enclosure 306. As a result, the chief ray enters the objective lens 304 in substantial agreement with the optical axis of the objective lens 304. The laser beam passing through the objective lens 304 is then focused onto the information recording surface of an optical recording medium (not illustrated).

The laser beam is reflected by the information recording surface, and the resulting return beam reverses along the same optical path. Which is to say, the return beam passes the objective lens 304, and is reflected by the raising mirror 380, thereby entering the hologram module 378. The laser beam is received by the plurality of light receiving components. As a result, a servo signal, which includes a focusing error signal and a tracking error signal, and an information recorded signal are detected and sent to a control circuit (not illustrated).

The control circuit controls the amounts of currents supplied to the focusing coils 368R and 368L and the tracking coils 370R and 370L, based on the focusing error signal and the tracking error signal.

Turning back to FIGS. 18 and 19, ten elastic support members 312, 314, 316, 318, 320, 322, 324, 326, 328, and 330 are arranged in parallel in the focusing direction, on one side of a plane (YZ plane) that includes the optical axis of the objective lens 304 and is substantially orthogonal to the tracking direction. Also, ten elastic support members 332, 334, 336, 338, 340, 342, 344, 346, 348, and 350 are arranged in parallel in the focusing direction, on the other side of the YZ plane. These two groups of ten elastic support members are symmetrical with respect to the YZ plane. Here, by arranging the elastic support members only in the focusing direction, the entire optical pickup can be made compact (i.e. reduced in size in the tracking direction) when compared with the case where they are arranged in the tracking direction too, as in the first embodiment. Hereinafter, a suspension unit that includes the elastic support members 312, . . . , 330 are called a suspension unit 311, whilst a suspension unit that includes the elastic support members 332, . . . , 350 is called a suspension unit 331.

The elastic support members of each of the suspension units 311 and 331 are formed by press working as in the first embodiment. For example, the following dimensions can be realized using a typical precision press working technique. The width of one elastic support member (i.e. the length in the focusing direction) is b=90 [μm]. The thickness of one elastic support member (i.e. the length in the tracking direction) is t=70 [μm]. The interval between adjacent elastic support members is s=250 [μm]. The width of one elastic support member group in the focusing direction is B=10× b+(10−1)×s=3.15 [mm]. This width B is smaller than the height of the movable member in the focusing direction. Thus, the increase in the number of elastic support members does not cause an increase in the size of the entire optical pickup in the focusing direction. Note here that the elastic support members may be formed by etching instead of by press working, as in the first embodiment.

The material and cross section of the elastic support members are the same as those in the first embodiment.

Thus, each suspension unit has more elastic support members in the third embodiment than in the first embodiment. In addition, each suspension unit has more holding members in the third embodiment than in the first embodiment.

Which is to say, the suspension unit 311 has holding members 382, 384, 386, and 388, whereas the suspension unit 331 has holding members 390, 392, 394, and 396. Thus, each suspension unit in the third embodiment has four holding members, while each suspension unit in the first embodiment has two holding members. Even when the number of holding members is increased in this way, the suspension unit can be formed by the same insert molding as in the first embodiment, so long as the number of mold cavities is increased with the increase in the number of holding members.

In the suspension units 311 and 331, the portions of the elastic support members between the holding members 382 and 384 and the portions of the elastic support members between the holding members 390 and 392 serve to elastically support the movable member. In the suspension unit 311, the uppermost elastic support member 312 and the lowermost elastic support member 330 are cut off between the holding members 386 and 388. In the suspension unit 331, the uppermost elastic support member 332 and the lowermost elastic support member 350 are cut off between the holding members 394 and 396.

After each of the suspension units 311 and 331 has been formed as a result of the first molding process, the elastic support member group in each of the suspension units 311 and 331 is bent at four points. Following this, the suspension units 311 and 331 are loaded in a mold for the second molding process, and the same insert molding (second molding process) as that of the first embodiment is performed to form the enclosure 306 and the block 310.

Once the enclosure 306 and the block 310 have been obtained, various components are mounted on the enclosure 306. In detail, the objective lens 304, the raising mirror 380, the focusing coils 368R and 368L, the tracking coils 370R and 370L, the hologram module 378, and the like are secured to the enclosure 306 by adhesion or the like.

After this, wiring is conducted to connect these components with the elastic support members.

The connection relationship between the components and the elastic support members is explained below, with reference to FIGS. 21A and 21B.

One end of the series-connected focusing coils 368R and 368L is connected with the enclosure end of the elastic support member 330, and the other end is connected with the enclosure end of the elastic support member 332.

One end of the series-connected tracking coils 370R and 370L is connected with the enclosure end of the elastic support member 312, and the other end is connected with the enclosure end of the elastic support member 350.

A positive terminal of the semiconductor laser in the hologram module 378 is connected with the enclosure end of the elastic support member 336, and a negative terminal of the semiconductor laser is connected with the enclosure end of the elastic support member 338.

An input terminal of a driving voltage Vcc for driving the light receiving components on the light emitting/receiving component substrate 374 in the hologram module 378 is connected with the enclosure end of the elastic support member 316. An input terminal of a reference voltage Vref on the light emitting/receiving component substrate 374 is connected with the enclosure end of the elastic support member 318. A ground terminal on the light emitting/receiving component substrate 374 is connected with the enclosure end of the elastic support member 314.

One terminal out of a pair of terminals for outputting a focusing error signal on the light emitting/receiving component substrate 374 in the hologram module 378 is connected with the enclosure end of the elastic support member 322, and the other terminal is connected with the enclosure end of the elastic support member 342.

One terminal out of a pair of terminals for outputting a tracking error signal on the light emitting/receiving component substrate 374 in the hologram module 378 is connected with the enclosure end of the elastic support member 324, and the other terminal is connected with the enclosure end of the elastic support member 344.

One terminal out of a pair of terminals for outputting an information recorded signal on the light emitting/receiving component substrate 374 in the hologram module 378 is connected with the enclosure end of the elastic support member 326, and the other terminal is connected with the enclosure end of the elastic support member 346.

On the other hand, the block end of each elastic support member is connected with a predetermined terminal in the control circuit and the like equipped in the body of a device into which the optical pickup 302 is incorporated. Here, the block ends of the elastic support members 320, 328, 334, 340, and 348 are connected with ground terminals in the control circuit and the like. Accordingly, these elastic support members 320, 328, 334, 340, and 348 are held at the ground potential. Thus, a total of six elastic support members including these five elastic support members and the elastic support member 314 are at the ground potential in this embodiment.

A driving voltage Vact between both ends of the focusing coils 368R and 368L or the tracking coils 370R and 370L is 0.2 to 0.6[V]. A driving voltage Vop of the semiconductor laser is about 2.0[V]. The driving voltage Vcc on the light emitting/receiving component substrate 374 is 3.0 to 5.0[V]. The reference voltage Vref is ½Vcc (i.e., 1.5 to 2.5[V]). Meanwhile, signal voltages of the above detected signals output from the light emitting/receiving component substrate 374 (the focusing error signal, the tracking error signal, and the information recorded signal) are several tens to several hundreds of mV. Thus, there are substantial differences in level between the voltages of the detected signals and the driving voltages. This being so, if the elastic support members are randomly connected, the detected signals may be affected by the driving voltages, thereby causing the S/N ratio to drop.

In view of this, the components (terminals) and the elastic support members are connected such that the elastic support members (320, 328, 334, 340, and 348) of the ground potential come between the elastic support members (312, 316, 318, 330, 332, 336, 338, and 350) for applying the driving voltages (for supplying driving power) and the elastic support members (322, 324, 326, 342, 344, and 346) for extracting the detected signals.

In other words, wiring (connection) is carried out in such a manner that at least one elastic support member, that is not connected to any component on the enclosure 306 but is connected to a circuit in the body of the device so as to have the ground potential, comes between an elastic support member used for supplying a driving voltage (driving power) and an elastic support member for extracting a detected signal. Suppose one electrical/electronic component is connected with the enclosure end of a predetermined elastic support member. Then another electrical/electronic component is connected with the enclosure end of an elastic support member that is separated from the predetermined elastic support member by at least one elastic support member not connected to any electrical/electronic component on the enclosure 306. This allows elastic support members which are not used for the wiring of the electrical/electronic components mounted on the enclosure 306, to be set at the ground potential. Hence the adverse effect of noise that occurs between different electrical/electronic components through elastic support members can be reduced.

Turning back to FIG. 19, the permanent magnets 362R, 364R, 362L, and 364L are stuck respectively to the outer yokes 356R, 358R, 356L, and 358L. Having done so, the base 308 is fixed onto the optical base.

After this, the block 310 is attached to the base 308 which is fixed on the optical base. Lastly, the auxiliary yokes 356R and 356L are mounted to complete the optical pickup 302.

Here, the elastic support member groups of the suspension units 311 and 331 may be situated nonparallel with each other when looked at in the focusing direction, as in the first embodiment. Also, the elastic support members in each of the elastic support member groups may partially be nonparallel with each other when looked at in the tracking direction, as in the first embodiment.

The present invention has been described by way of the above embodiments, though it should be obvious that the invention is not limited to the above. Example modifications are given below.

(1) The above embodiments describe the MC type where the focusing and tracking coils are provided on the enclosure and the magnet-equipped yokes (magnetic circuit) are provided on the base, but the MM (moving magnet) type may instead be used. The MM type is a construction of a pickup in which the magnet-equipped yokes are provided on the enclosure and the focusing and tracking coils are provided on the base. In the case of the MM type, the number of elastic support members required for wiring decreases. However, there may be a need to mount additional electrical/electronic components on the enclosure. In such a case, more elastic support members than the MC type may become necessary. Also, if the correction region of the liquid crystal tilt correction component is divided into smaller regions, the same number of wires as these correction regions become necessary. In such a case too, the number of elastic support members need be increased.

(2) The above embodiments describe the case where the enclosure and the block are formed by insert molding (second molding process) with the suspension units as insert pieces, but the method of forming the enclosure and the block is not limited to insert molding. For instance, the enclosure and the block may each be molded individually. In this case, the enclosure is inject-molded using a mold for forming the enclosure (enclosure molding process), and the block is inject-molded using a mold for forming the block (block molding process).

As an alternative, the enclosure and the block may be molded using a single mold, instead of using the separate molds. Such a mold has two mold cavities for the enclosure and the block, with it being possible to form the enclosure and the block in one process (enclosure and block molding process).

The enclosure and the block formed in this way are then connected with the holding members of the suspension units using an adhesive.

Alternatively, they may be connected using ultrasonic welding.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A manufacturing method for an optical pickup in which a movable member carrying an objective lens is supported by a fixed member through a pair of elastic support member groups so as to be movable in a focusing direction and a tracking direction, each of the elastic support member groups being made up of a plurality of elastic support members arranged in parallel, comprising:
    a suspension unit forming step of forming, by insert molding, two holding members at different positions of each of the elastic support member groups in a lengthwise direction of the plurality of elastic support members so as to hold together the plurality of elastic support members, thereby forming a pair of suspension units, the holding members being made of a synthetic resin; and
    a connecting step of opposing the pair of suspension units to each other with an arrangement direction of the plurality of elastic support members being substantially same as the focusing direction, and connecting one holding member of each of the suspension units to the movable member and the other holding member of each of the suspension units to the fixed member.

2. The manufacturing method of claim 1,
    wherein in the connecting step the holding members are connected to the movable member and the fixed member, by forming the movable member and the fixed member by insert molding with the holding members as insert pieces.

3. The manufacturing method of claim 1, further comprising:
    a movable member forming step of forming the movable member; and
    a fixed member forming step of forming the fixed member,
    wherein in the connecting step the holding members are attached to the movable member and the fixed member.

4. The manufacturing method of claim 1, further comprising:
    a plate processing step of making stripe holes through a flat plate to form the plurality of elastic support members in stripes that are joined together at edge parts of the plate,
    wherein the suspension unit forming step includes:
    a substep of sandwiching the processed plate by a two-piece mold that opens and closes in a direction substantially orthogonal to the plate, and injecting the synthetic resin into a mold cavity to form each of the holding members.

5. The manufacturing method of claim 4,
    wherein in the suspension unit forming step the synthetic resin is injected from a part of the mold that corresponds to a symmetry center of the holding member in the arrangement direction of the plurality of elastic support members.

6. The manufacturing method of claim 4,
    wherein in the connecting step the pair of suspension units are opposed so that the pair of elastic support member groups are nonparallel with each other when looked at in the focusing direction.

7. The manufacturing method of claim 6,
    wherein in the connecting step the pair of suspension units are opposed so that the pair of elastic support member groups are bent in different directions from each other when looked at in the focusing direction.

8. The manufacturing method of claim 4, further comprising:
    a bending step of bending part of each of the plurality of elastic support members between the holding members, before the connecting step; and
    a vibration suppression material providing step of covering the bent part with a vibration suppression material, after the connecting step.

9. The manufacturing method of claim 8,
    wherein the bending step is carried out by making the stripe holes through the plate in the plate processing step so that elastic support members on both sides of an arrangement center of the plurality of elastic support members are each partly bent toward the arrangement center.

10. The manufacturing method of claim 1,
    wherein in the suspension unit forming step a surface of each of the holding members to be connected to the movable member or the fixed member is roughened.

11. The manufacturing method of claim 1, further comprising:
    a bending step of bending part of each of the plurality of elastic support members between the holding members, before the connecting step; and
    a vibration suppression material providing step of covering the bent part with a vibration suppression material, after the connecting step.

12. The manufacturing method of claim 11,
    wherein the bending step is carried out by press working.

* * * * *